(12) United States Patent
Liu et al.

(10) Patent No.: US 12,273,356 B2
(45) Date of Patent: Apr. 8, 2025

(54) SYSTEMS AND METHODS FOR DIGITAL THREAT ASSESSMENT AND MITIGATION USING T-DIGEST SCORE DISTRIBUTION REPRESENTATIONS AND PERCENTILE-BASED THREAT SCORING IN A DIGITAL THREAT MITIGATION PLATFORM

(71) Applicant: Sift Science, Inc., San Francisco, CA (US)

(72) Inventors: Wei Liu, San Francisco, CA (US); Amey Farde, San Francisco, CA (US); Mohammed Jouahri, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 18/677,279

(22) Filed: May 29, 2024

(65) Prior Publication Data

US 2025/0007923 A1    Jan. 2, 2025

Related U.S. Application Data

(60) Provisional application No. 63/615,668, filed on Dec. 28, 2023, provisional application No. 63/523,534, filed on Jun. 27, 2023.

(51) Int. Cl.
*H04L 9/40* (2022.01)
*G06N 20/00* (2019.01)

(52) U.S. Cl.
CPC ............. *H04L 63/14* (2013.01); *G06N 20/00* (2019.01)

(58) Field of Classification Search
CPC . H04L 63/14; H04L 63/1416; H04L 63/1433; H04L 63/20
See application file for complete search history.

(56) References Cited

U.S. PATENT DOCUMENTS

| | | | |
|---|---|---|---|
| 10,515,096 B1 * | 12/2019 | Choudhary | H04L 43/04 |
| 10,592,093 B2 * | 3/2020 | Sainani | G06F 16/2462 |
| 10,762,206 B2 * | 9/2020 | Titonis | H04W 12/128 |
| 10,776,719 B2 * | 9/2020 | Maheshwari | G06N 20/00 |

(Continued)

*Primary Examiner* — Hosuk Song
(74) *Attorney, Agent, or Firm* — Padowithz Alce; Alce PLLC

(57) ABSTRACT

A system and method for quantile-based assessment and handling of digital events in a digital threat mitigation platform includes receiving, via an application programming interface (API), a request from a subscriber to assess a threat of a digital event, computing, using one or more threat scoring machine learning models, a digital threat inference based on one or more corpora of feature vectors associated with the digital event, wherein the digital threat inference includes an uncalibrated digital threat score, retrieving, from a database, a T-Digest data structure of historical digital threat scores of the subscriber, computing, using the T-Digest data structure of historical digital threat scores, a percentile-based threat score based on the uncalibrated digital threat score computed for the digital event, and executing an automated disposal decision computed for the digital event based on at least the percentile-based threat score satisfying automated decisioning instructions of the digital threat mitigation platform.

20 Claims, 12 Drawing Sheets

(56) References Cited

U.S. PATENT DOCUMENTS

| | | | |
|---|---|---|---|
| 11,340,774 B1 * | 5/2022 | Sainani | G06F 3/0488 |
| 11,575,695 B2 * | 2/2023 | Liu | H04L 63/1416 |
| 11,893,121 B1 * | 2/2024 | Imrem | G06F 21/577 |
| 11,916,927 B2 * | 2/2024 | St. Pierre | H04L 63/1408 |

* cited by examiner

Generating one or more Score Distribution Representations using a T-Digest Algorithm S205

Configuring a Digital Event Application Programming Interface for Percentile-Based Threat Scoring S210

Configuring and Implementing one or more Automated Decisioning Workflows with Percentile-Based Threat Score Thresholding S220

Obtaining Digital Event Data S230

Computing a Digital Threat Score and one or more Percentile-Based Threat Scores for a Subject Digital Event S240

Computing, using an Automated Decisioning Workflow, an Automated Disposal Decision for the Subject Digital Event S250

FIGURE 2

```
curl -X POST "https:// api.company.com /v205/
events?return_workflow_status=true&retur
n_route_info&abuse_types=legacy&fields=s
core_percentiles""
-H "Accept: application/json"
-d '{
   "$api_key": "YOUR_API_KEY",
   "$type": "$create_order",
   "$user_id": "test_user"
}'
```

FIGURE 3

```
HTTP/1.1 200 OK
Content-Type: text/json;charset=UTF-8
Connection: keep-alive {
  "body": {
    "status": 0,
    "error_message": "OK",
    "request": "body_of_the_request_you_sent",
    "time": 1454317138,
    "score_response": {
      "status": 0,
      "error_message": "OK",
      "user_id": "billy_jones_301",
      "scores": {
        "payment_abuse": {
          "score": 0.898391231245,
          "percentiles": {
            "last_1_day": 0.9845721,
            "last_5_days": 0.9754323,
            "last_7_days": 0.97315456,
            "last_10_days":0.98773876
          },
          "reasons": [
            {
              "name": "UsersPerDevice",
              "value": 4,
              "details": {
                "users": "a, b, c, d"
              }
            }
          ]
        },
        "promotion_abuse": {
          "score": 0.472838192111,
          "reasons": []
        },
      },
      "latest_labels": {
        "payment_abuse": {
          "is_fraud": true,
          "time": 1352201000,
          "description": "received a chargeback"
        },
        "promotion_abuse": {
          "is_fraud": false,
          "time": 1352203000
        }
      }
    }
  },
  "http_status_code": 200
}
```

FIGURE 4

SYSTEMS AND METHODS FOR DIGITAL THREAT ASSESSMENT AND MITIGATION USING T-DIGEST SCORE DISTRIBUTION REPRESENTATIONS AND PERCENTILE-BASED THREAT SCORING IN A DIGITAL THREAT MITIGATION PLATFORM

CROSS-REFERENCE TO RELATED APPLICATIONS

This application claims the benefit of U.S. Provisional Application No. 63/615,668, filed 28 Dec. 2023 and U.S. Provisional Application No. 63/523,534, filed 27 Jun. 2023, which are incorporated in their entireties by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enable entities to engage and perform an incalculable number of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF SUMMARY OF THE INVENTION(S)

In one embodiment, a computer-implemented method for quantile-based assessment and handling of digital events in a digital threat mitigation platform includes receiving, via an application programming interface (API), a request from a subscriber to assess a threat of a digital event occurring on an online platform of the subscriber; computing, using one or more threat scoring machine learning models, a digital threat inference based on one or more corpora of feature vectors extracted from digital event data associated with the digital event, wherein: the digital threat inference includes an uncalibrated digital threat score that indicates a likelihood that the digital event is a fraudulent digital event; retrieving, from a database, a T-Digest data structure of historical digital threat scores of the subscriber based on querying the database using an identifier of the subscriber as a search parameter; computing, using the T-Digest data structure of historical digital threat scores, a percentile-based threat score based on the uncalibrated digital threat score computed for the digital event, wherein: the percentile-based threat score indicates a threat severity percentile of the uncalibrated digital threat score relative to historical digital threat scores of the subscriber for a target time span; and executing an automated disposal decision computed for the digital event based on at least the percentile-based threat score satisfying automated decisioning instructions of the digital threat mitigation platform.

In one embodiment, the threat severity percentile indicates a percentile ranking or percentile position of the uncalibrated digital threat score of the digital event relative to the historical digital threat scores of the subscriber.

In one embodiment, the digital event corresponds to one of a plurality of predetermined digital event types defined by the digital threat mitigation platform, and the T-Digest data structure of historical digital threat scores of the subscriber was created using only historical digital threat scores of the subscriber that correspond to historical digital events of a same digital event type as the digital event.

In one embodiment, the T-Digest data structure of historical digital threat scores of the subscriber was created using only historical digital threat scores of the subscriber that correspond to a target subset of digital event traffic associated with the digital threat mitigation service (e.g., transactions with a status of pending, etc.).

In one embodiment, computing the percentile-based threat score includes: (a) identifying, via one or more computers, a centroid of a plurality of centroids within the T-Digest data structure of historical digital threat scores that is closest to the uncalibrated digital threat score; and (b) calculating, via the one or more computers, the threat severity percentile of the digital threat score based on interpolating a percentile position of the uncalibrated digital threat score using the centroid and one or more neighboring centroids, wherein each neighboring centroid of the one or more neighboring centroids is within a predetermined proximity to the centroid.

In one embodiment, the computer-implemented method further includes: sourcing, via one or more computers, one or more corpora of uncalibrated historical digital threat scores computed by the one or more threat scoring machine learning models for the subscriber; and generating, via the one or more computers, the T-Digest data structure of historical digital threat scores of the subscriber based on providing the one or more corpora of uncalibrated historical digital threat scores of the subscriber as input to a T-Digest construction algorithm, wherein the T-Digest construction algorithm includes a set of computer-executable instructions that, when executed, executes an automated sequence of tasks that creates the T-Digest data structure of historical digital threat scores of the subscriber.

In one embodiment, the automated sequence of tasks include: initializing, via the one or computers, an empty T-Digest data structure; and generating a plurality of digital threat score-based centroids based on inserting each uncalibrated historical digital threat score of the one or more corpora of uncalibrated historical digital threat scores into the empty T-Digest data structure.

In one embodiment, the one or more threat scoring machine learning models includes a cohort threat scoring machine learning model, and the computer-implemented method further includes: obtaining a training corpus of labeled digital event data samples associated with a plurality of distinct subscribers to the digital threat mitigation platform, wherein: (1) the training corpus of labeled digital event data samples includes a distinct set of labeled digital event data samples for each distinct subscriber of the plurality of distinct subscribers, and (2) the plurality of distinct subscribers defines a cohort; and configuring the cohort threat scoring machine learning model based on a training of a machine learning model using the training corpus of labeled digital event data samples.

In one embodiment, the computer-implemented method further includes: sourcing, via one or more computers, a dataset of uncalibrated digital threat scores computed by the cohort threat scoring machine learning model for a predetermined time period; generating a source T-Digest data structure of uncalibrated digital threat scores based on providing the dataset of uncalibrated digital threat scores to a T-Digest construction algorithm, wherein the T-Digest construction algorithm includes a set of computer-executable instructions that, when executed, executes an automated sequence of tasks that creates the source T-Digest data structure of uncalibrated digital threat scores.

In one embodiment, the computer-implemented method further includes: identifying a target digital threat score distribution defined by the subscriber, wherein: the target digital threat score distribution indicates to the digital threat mitigation platform a score distribution preference of the subscriber, and the target digital threat score distribution is represented by a corresponding T-Digest data structure; and calibrating the uncalibrated digital threat score to a calibrated digital threat score using the source T-Digest data structure of uncalibrated digital threat scores and the target digital threat score distribution.

In one embodiment, calibrating the uncalibrated digital threat score to the calibrated digital threat score includes: (a) computing, using the source T-Digest data structure of uncalibrated digital threat scores, an uncalibrated percentile score that corresponds to the uncalibrated digital threat score, wherein the uncalibrated percentile score indicates a percentile position of the uncalibrated digital threat score relative to other uncalibrated digital threat scores within the source T-Digest data structure of uncalibrated digital threat scores, and (b) identifying, within the target digital threat score distribution, the calibrated digital threat score based on traversing the target digital threat score distribution using the uncalibrated percentile score, wherein the calibrated digital threat score corresponds to a same percentile position as the uncalibrated percentile score.

In one embodiment, the computer-implemented method further includes: in response to receiving the request from the subscriber to assess the threat of the digital event: transmitting an API response to the subscriber that includes the calibrated digital threat score and the percentile-based threat score associated with the digital event.

In one embodiment, a computer-implemented method for quantile-based assessment and handling of digital events in a digital threat mitigation platform includes receiving, via an application programming interface (API), a request from a subscriber to assess a threat of a digital event occurring on an online platform of the subscriber; computing, using one or more threat scoring machine learning models, a digital threat inference based on one or more corpora of feature vectors extracted from digital event data associated with the digital event, wherein: the digital threat inference includes a digital threat score that indicates a likelihood that the digital event is a fraudulent digital event; retrieving, from a computer database, one or more T-Digest data structures of historical digital threat scores of the subscriber based on querying the database using an identifier of the subscriber as a search parameter; computing, using the one or more T-Digest data structures of historical digital threat scores, a plurality of percentile-based threat scores based on the digital threat score computed for the digital event, wherein: each percentile-based threat score of the plurality of percentile-based threat scores indicates a threat severity percentile of the digital threat score relative to historical digital threat scores of the subscriber for a distinct time span; and executing an automated disposal decision computed for the digital event based on an assessment of (i) the digital threat score and (ii) at least one of the plurality of percentile-based threat scores against automated decisioning instructions of the digital threat mitigation platform.

In one embodiment, the digital threat score includes a numerical value that quantifies the likelihood that the digital event is the fraudulent digital event; and each of the plurality of percentile-based threat scores further indicates a relative percentile position or percentile rank of the digital threat score within a distribution of historical digital threat scores of the subscriber for a target time span.

In one embodiment, the one or more T-Digest data structures of historical digital threat scores include: a first T-Digest data structure that represents a distribution of digital threat scores of the subscriber that occurred within a first time span, a second T-Digest data structure that represents a distribution of digital threat scores of the subscriber that occurred within a second time span, a third T-Digest data structure that represents a distribution of digital threat scores of the subscriber that occurred within a third time span, and a fourth T-Digest data structure that represents a distribution of digital threat scores of the subscriber that occurred within a fourth time span, wherein the first time span, the second time span, the third time span, and the fourth time span are different time spans.

In one embodiment, computing the plurality of percentile-based threat scores include: computing, using the first T-Digest data structure, a first percentile-based threat score that indicates the threat severity percentile of the digital threat score within the distribution of digital threat scores of the subscriber of the first time span; computing, using the second T-Digest data structure, a second percentile-based threat score that indicates the threat severity percentile of the digital threat score within the distribution of digital threat scores of the subscriber of the second time span; computing, using the third T-Digest data structure, a third percentile-based threat score that indicates the threat severity percentile of the digital threat score within the distribution of digital threat scores of the subscriber of the third time span; and computing, using the fourth T-Digest data structure, a fourth percentile-based threat score that indicates the threat severity percentile of the digital threat score within the distribution of digital threat scores of the subscriber of the fourth time span.

In one embodiment, a computer-implemented method for quantile-based assessment and handling of digital events in a digital threat mitigation platform includes computing, using one or more threat scoring machine learning models, a digital threat inference based on one or more corpora of feature vectors extracted from digital event data associated with a digital event of a subscriber, wherein: the digital threat inference includes a digital threat score that indicates a likelihood that the digital event is a fraudulent digital event; retrieving, from a database, a T-Digest data structure of historical digital threat scores of the subscriber based on querying the database using an identifier of the subscriber as a search parameter; computing, using the T-Digest data structure of historical digital threat scores, a percentile-based threat score based on the digital threat score computed for the digital event, wherein: the percentile-based threat score indicates a threat severity percentile of the digital threat score relative to historical digital threat scores of the subscriber for a target time span; and executing an automated disposal decision computed for the digital event based on at least the percentile-based threat score satisfying automated decisioning instructions of the digital threat mitigation platform.

In one embodiment, the automated decisioning instructions of the digital threat mitigation platform includes an automated decisioning workflow, and the automated decisioning workflow includes an automated decisioning route that automatically blocks a respective digital event when a given percentile-based threat score of a target time span computed for the respective digital event is greater than a predetermined percentile-based threat score threshold.

In one embodiment, the automated decisioning instructions of the digital threat mitigation platform includes an automated decisioning workflow, and the automated decisioning workflow includes an automated decisioning route that automatically blocks a respective digital event when (i) a given percentile-based threat score of a target time span computed for the respective digital event is greater than a predetermined percentile-based threat score threshold and (ii) a given digital threat score computed for the respective digital event is greater than a predetermined digital threat score threshold.

In one embodiment, the automated decisioning instructions of the digital threat mitigation platform includes an automated decisioning workflow, and the automated decisioning workflow includes an automated decisioning route that automatically blocks a respective digital event when (i) a given percentile-based threat score of a target time span computed for the respective digital event is greater than a predetermined percentile-based threat score threshold and (ii) a target feature associated with the respective digital event is greater than a predetermined feature threshold.

In one embodiment, the digital threat score is an uncalibrated digital threat score, the computer-implemented method further includes: obtaining a subscriber-preferred t-digest data structure of digital threat scores, wherein the subscriber-preferred t-digest data structure of digital threat scores represents a score distribution preference of the subscriber; identifying, within a subscriber-preferred t-digest data structure of digital threat scores, a calibrated digital threat score value based on querying the subscriber-preferred t-digest data structure of digital threat scores using the threat severity percentile as a query parameter, wherein calibrated digital threat score value corresponds to a same percentile of the threat severity percentile computed for the digital threat score; and executing the automated disposal decision computed for the digital event based on the percentile-based threat score and the calibrated digital threat score value satisfying the automated decisioning instructions of the digital threat mitigation platform.

In one embodiment, the T-Digest data structure of historical digital threat scores of the subscriber includes: a plurality of centroids, wherein each centroid of the plurality of centroids includes: (a) a mean digital threat score that indicates an average value of all digital threat scores contained within a respective centroid, (b) a digital threat score count that indicates a total number of digital threat scores aggregated within the respective centroid, and (c) a cumulative digital threat score count that indicates a total number of digital threat scores in the respective centroid and all preceding centroids having a respective mean digital threat score less than the mean digital threat score of the respective centroid.

In one embodiment, the digital event corresponds to a create order event type, and the T-Digest data structure of historical digital threat scores of the subscriber was created using only historical digital threat scores of the subscriber that correspond to previous create order-type digital events of the subscriber.

In one embodiment, the digital event corresponds to a login event type, and the T-Digest data structure of historical digital threat scores of the subscriber was created using only historical digital threat scores of the subscriber that correspond to previous login-type digital events of the subscriber.

In one embodiment, the threat severity percentile indicates a percentile ranking or percentile position of the uncalibrated digital threat score of the digital event relative to a distribution of historical digital threat scores of the subscriber.

In one embodiment, a computer-implemented method for quantile-based assessment and handling of digital events in a digital threat mitigation platform includes automatically receiving, via an application programming interface (API), a request from a subscriber to assess a threat of a digital event occurring on an online platform of the subscriber; automatically computing, using one or more threat scoring machine learning models, a digital threat inference based on one or more corpora of feature vectors extracted from digital event data associated with the digital event, wherein: the digital threat inference includes an uncalibrated digital threat score that indicates a likelihood that the digital event is a fraudulent digital event; automatically retrieving, from a database, a T-Digest data structure of historical digital threat scores of the subscriber based on querying the database using an identifier of the subscriber as a search parameter; automatically computing, using the T-Digest data structure of historical digital threat scores, a percentile-based threat score based on the uncalibrated digital threat score computed for the digital event, wherein: the percentile-based threat score indicates a threat severity percentile of the uncalibrated digital threat score relative to historical digital threat scores of the subscriber for a target time span; and automatically executing, via one or more computers, an automated disposal decision computed for the digital event based on at least the percentile-based threat score satisfying automated decisioning instructions of the digital threat mitigation platform.

BRIEF DESCRIPTION OF THE FIGURES

FIG. 2 illustrates an example method in accordance with one or more embodiments of the present application;

FIG. 3 illustrates an example of a digital event application programming interface request in accordance with one or more embodiments of the present application;

FIG. 4 illustrates an example of digital threat score data and percentile-based threat score data returned from a digital event application programming interface request in accordance with one or more embodiments of the present application;

DESCRIPTION OF THE PREFERRED EMBODIMENTS

Figure 1:
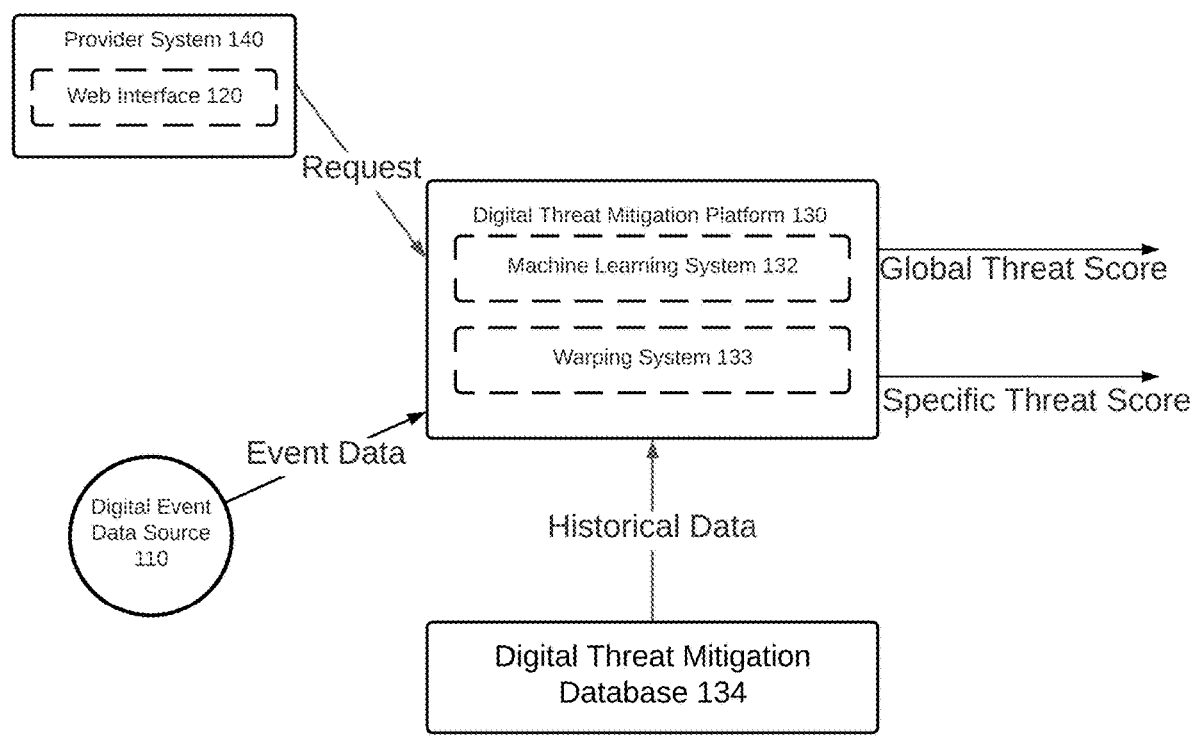
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.
Overview As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities, as described in U.S. Pat. No. 9,954,879, which is incorporated herein in its entirety by this reference.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current digital events to mitigate or eliminate a digital threat associated therewith. Additionally, or alternatively, in one or more embodiments, digital event data processing decisions may be automated via automated decisioning workflows, as described in U.S. Pat. No. 9,954,879, which is incorporated herein in its entirety by this reference and digital event data processing decisions may be performed with manual input from one or more human analysts or the like. In such embodiments, decisions output from one or more review queues of the one or more human analysts may be converted to training data for training and improving one or more threat classifying models of the threat mitigation service including, but not limited to, a unified threat model.

1. System for Digital Fraud and/or Abuse Detection and Scoring

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables subscribers to and/or customers of a threat mitigation service implementing the system 100 to generate a request for a global digital threat score and additionally, make a request for specific digital threat scores for varying digital abuse types. After or contemporaneously with receiving a request from the web interface 120, the system 100 may function to collect digital event data from the one or more digital event data sources 110. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources 110 may include a plurality of web servers and/or one or more data repositories associated with a plurality of service providers. Accordingly, the one or more digital event data sources 110 may also include the service provider system 140.

The one or more digital event data sources 110 function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implements at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources 110. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data, and namely, to classify or detect features that may indicate a possibility of fraud and/or abuse. The machine learning system 132 may additionally utilize the input from the one or more digital event data sources 110 and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFIT, XLM UDify, MT-DNN, SpanBERT, ROBERTa, XLNet, ERNIE, KnowBERT, VideoBERT, ERNIE BERT-wwm, GPT, GPT-2, GPT-3, GPT-3.5, GPT-4, ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enables users of the digital resources associated with the service provider's online presence to perform transactions, exchanges of data, perform one or more digital activities, and the like.

The service provider 140 may include one or more web or private computing servers and/or web or private computing devices. Preferably, the service provider 140 (i.e., a subscriber or the like) includes one or more client devices functioning to operate the web interface 120 to interact with and/or communicate with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. Additionally, or alternatively, the web (client) interface 120 may be used to collect manual decisions with respect to a digital event processing decision, such as hold, deny, accept, additional review, and/or the like. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores. In some embodiments, the web interface 120 comprises an application programming interface (API) client and/or a client browser.

Additionally, the systems and methods described herein may implement the digital threat mitigation platform in accordance with the one or more embodiments described in the present application as well as in the one or more embodiments described in U.S. patent application Ser. No. 15/653,373, which is incorporated by reference in its entirety.

2. Method for Generating T-Digest Score Distribution Representations and Percentile-Based Threat Scoring in a Digital Threat Mitigation Platform As shown in FIG. 2, the method 200 for generating T-Digest score distribution representations and percentile-based threat scoring in a digital threat mitigation service may include generating one or more score distribution representations using a T-Digest algorithm S205, configuring a digital event application programming interface for percentile-based threat scoring S210, configuring and implementing one or more automated decisioning workflows with percentile-based threat score thresholding S220, obtaining digital event data S230, computing a digital threat score and one or more percentile-based threat scores for a subject digital event S240, and computing, using an automated decisioning workflow, an automated disposal decision for the subject digital event S250.

The systems, methods, and embodiments described herein may be used in a variety of fraud detection technology areas where mitigating score instability is critical. This includes, but is not limited to, automated fraud decisioning systems, machine learning-based fraud decisioning services, automated digital event scoring systems, online transaction monitoring, and real-time fraud prevention services. Furthermore, as described in more detail herein, the systems, methods, and embodiments may use percentile-based threat scoring to increase the stability and accuracy of fraud detection.

At least one technical advantage of percentile-based threat scoring includes reducing the number of false positives and false negatives (e.g., minimizing the number of cases where legitimate digital events are flagged as fraudulent, maximizing the number of cases where fraudulent digital events are accurately identified as such, etc.).

Another technical advantage of percentile-based threat scoring includes the ability for a digital threat mitigation service or platform to adapt, in real-time or near real-time, to changing threat score distribution(s) of a given subscriber or a cohort of subscribers.

Another technical advantage of percentile-based threat scoring includes the ability for a digital threat mitigation service to compute and implement automated decisions (e.g., block, allow, review, etc.) for a respective digital event based on historical digital events of the subscriber that occurred in one or more target temporal time periods (e.g., based on digital events of the respective subscriber and the corresponding digital threat scores that occurred in the last twenty-four (24) hours, based on digital events of the respective subscriber and the corresponding digital threat scores that occurred in the last five (5) days, based on digital events of the respective subscriber and the corresponding digital threat scores that occurred in the last seven (7) days, based on digital events of the respective subscriber and the corresponding digital threat scores that occurred in the last ten (10) days, etc.).

Another technical advantage of percentile-based threat scoring includes the ability for a digital threat mitigation service to compute and implement automated decisions (e.g., block, allow, review, etc.) for a respective digital event based on a target population of historical digital events of the subscriber that occurred in one or more target temporal time periods (e.g., based on all create order-type digital events of the respective subscriber and the corresponding digital threat scores that occurred in a target temporal period, based on all create content-type digital events of the respective subscriber and the corresponding digital threat scores that occurred in a target temporal period, based on all create login-type digital events of the respective subscriber and the corresponding digital threat scores that occurred in a target temporal period, etc.).

Another technical advantage of percentile-based threat scoring includes the ability to calibrate a subject raw digital threat score (e.g., uncalibrated digital threat score or the like) computed by a machine learning model (e.g., threat scoring machine learning model) to a calibrated digital threat score that aligns with or maps to a preferred score distribution defined by a subscriber.

Another technical advantage of percentile-based threat scoring includes the ability to allow users of the digital threat mitigation service or platform to set or define percentile-based thresholds within one or more automated decisioning workflows. This may allow subscribers to define or configure one or more automated decisioning routes of a subject automated decisioning workflow based on multiple distinct scoring criteria.

2.05 Generating a Score Distribution Representation Using a T-Digest Algorithm

S205, which includes generating a score distribution representation, may function to generate, using a T-Digest algorithm or the like, one or more score distribution representations for each subscriber subscribing to a system or service implementing method 200. A T-Digest algorithm, as generally referred to herein, may enable a compression of one or more large datasets of a subject subscriber (i.e., a large volume of digital threat scores, etc.) into a more compact form or representation that preserves the ability to accurately estimate quantiles and/or percentiles. It shall be recognized that this compact representation, generally referred to herein as a "T-Digest digital threat score representation," may maintain the relative order of raw digital threat scores, which may enable precise percentile calculations without hindering the performance of the system or service implementing method 200.

In one or more embodiments, S205 may function to capture and/or process digital threat scores outputted by one or more threat scoring models of the system or service implementing method 200 on a real-time or near real-time basis. For instance, in a non-limiting example, generating a T-Digest digital threat score representation for a subject subscriber may include aggregating digital threat score data of the subject subscriber over one or more specified time intervals (e.g., hourly, daily, weekly, etc.) to form a raw or uncalibrated threat score distribution profile. Accordingly, S205 may function to transform, using a T-Digest algorithm or the like, the raw or uncalibrated threat score distribution profile into a T-Digest digital threat score representation, which represents the raw or uncalibrated threat score distribution profile in a data-conscious structure or format to facilitate faster and more efficient processing, storage, and/or retrieval of digital threat score data for downstream automated decisioning processes, as described in more detail herein.

Stated another way, in one or more embodiments, S205 may use the T-Digest algorithm within a digital fraud detection system or service to quickly and accurately identify digital transactions or digital events that fall within a high-risk percentile. That is, in one or more embodiments, capturing or creating a T-Digest representation of digital threat scores for each subscriber subscribing to the system or service implementing method 200, may enable the system or service to quickly determine the percentile ranking of a subject digital threat score relative to historical digital threat scores (e.g., historical digital threat scores of the subscriber) and, in turn, perform an automated disposal action.

At least one technical benefit of using a T-Digest algorithm for generating a digital threat score distribution representation may enable the system or service implementing method 200 to handle large volumes of data without compromising the accuracy of percentile calculations. This may be advantageous in environments where digital threat scores are continuously generated and require immediate processing. Furthermore, using a T-Digest digital threat score representation may enable a system or service implementing method 200 to dynamically adjust to changing data patterns while maintaining consistent decision-making criteria over time.

Another technical benefit of using a T-digest algorithm may enable a system or service implementing method 200 to map raw digital threat scores (e.g., uncalibrated digital threat scores or the like) outputted from one or more machine learning models of the system or service to a target threat score distribution. That is, in one or more embodiments, the T-digest algorithm may facilitate a storage of raw or uncalibrated digital threat scores in a compressed yet representative form, allowing for accelerated computation of percentiles within the raw or uncalibrated digital threat score distribution. Subsequently, in one or more embodiments, the computed percentiles may be used to map uncalibrated digital threat scores (i.e., raw digital threat scores) to their corresponding calibrated digital threat score in a target distribution, ensuring that the resulting calibrated digital threat scores accurately mirror the same level of relative risk as the initial uncalibrated digital threat scores. It shall be recognized that the above-mentioned mapping process may be performed dynamically, allowing for continuous recalibration in response to new threat score data, which may assist with score stabilization to mitigate model shift and/or model drift.

It shall be noted that, in one or more embodiments, S205 may function to create a T-Digest data structure representation of digital threat scores (e.g., T-Digest data structure of historical digital threat scores) using any suitable T-digest construction algorithm. For example, in a non-limiting example, S205 may use a Greenwald-Khanna T-digest construction algorithm, a MergingDigest T-digest construction algorithm, a DDSketch T-digest construction algorithm, or a T-Digest with AVL trees construction algorithm. In other words, S205 may use any suitable T-digest construction algorithm that is capable of summarizing or representing one or more datasets while preserving statistical properties of the one or more datasets.

In one or more embodiments, for each threat scoring machine learning model or model version configured, generated, or trained by the digital threat mitigation platform, S205 may function to create a corresponding T-Digest data structure of historical digital threat scores (e.g., a T-digest representation) for each subscriber to the digital threat mitigation platform. A T-Digest data structure, in one or more embodiments, may be a probabilistic representation of historical digital threat scores computed by a respective threat scoring machine learning model or an ensemble of threat scoring machine learning models for a respective subscriber.

For instance, in a non-limiting example, S205 may function to create a T-Digest data structure of historical digital threat scores for a target subscriber based on the digital threat scores computed or outputted by a target threat scoring machine learning model for the target subscriber. In such a non-limiting example, a system or service implementing method 200 may function to source, via one or more computers, one or more corpora of digital threat scores computed by the target threat scoring machine learning model for the target subscriber. Accordingly, in one or more embodiments, a system or service implementing method 200 may function to generate, via the one or more computers, the T-Digest data structure of historical digital threat scores for the target subscriber based on providing the one or more corpora of digital threat scores of the target subscriber as input to a T-Digest construction algorithm. It shall be recognized that, in one or more embodiments, the T-Digest construction algorithm may include a set of computer-executable instructions that, when executed, executes an automated sequence of tasks that creates the T-Digest data structure of historical digital threat scores of the target subscriber.

Additionally, or alternatively, in such a non-limiting example, S205 may function to create a T-Digest data structure of uncalibrated digital threat scores for a subject subscriber based on the uncalibrated digital threat scores computed or outputted by the target threat scoring machine learning model. In such a non-limiting example, a system or service implementing method 200 may function source, via one or more computers, one or more datasets of uncalibrated digital threat scores computed by the target threat scoring machine learning model for the target subscriber for a predetermined time span (e.g., past 24 hours, past 5 days, past 7 days, past 10 days, etc.). Accordingly, in one or more embodiments, a system or service implementing method 200 may function to generate, via the one or more computers, the T-Digest data structure of uncalibrated historical digital threat scores for the subject subscriber based on providing the one or more datasets of uncalibrated digital threat scores of the subject subscriber as input to a T-Digest construction algorithm. It shall be noted that, in some embodiments, the phrase "T-Digest data structure of uncalibrated digital threat scores" may be interchangeably referred to herein as a "source T-Digest data structure of uncalibrated digital threat scores."

Additionally, or alternatively, in such a non-limiting example, S205 may function to create a T-Digest data structure of uncalibrated digital threat scores for a subject subscriber (e.g., another subscriber) based on the uncalibrated digital threat scores computed or outputted by one or more threat scoring machine learning models (e.g., an ensemble of threat scoring machine learning models, a plurality of threat scoring machine learning models, etc.). In such a non-limiting example, a system or service implementing method 200 may function to source, via one or more computers, one or more datasets of uncalibrated digital threat scores computed by the one or more threat scoring machine learning model for the subject subscriber for a predetermined time span. Accordingly, in one or more embodiments, a system or service implementing method 200 may function to generate, via the one or more computers, the T-Digest data structure of uncalibrated historical digital threat scores for the subject subscriber based on providing the one or more datasets of uncalibrated digital threat scores of the subject subscriber as input to a T-Digest construction algorithm.

Additionally, or alternatively, in such a non-limiting example, S205 may function to create a T-Digest data structure of calibrated digital threat scores for a subject subscriber (e.g., another subscriber). In such a non-limiting example, a system or service implementing method 200 may function to source, via one or more computers, one or more datasets of calibrated digital threat scores for the subject subscriber for a predetermined time span. Accordingly, in one or more embodiments, a system or service implementing method 200 may function to generate, via the one or more computers, the T-Digest data structure of calibrated historical digital threat scores for the subject subscriber based on providing the one or more datasets of calibrated digital threat scores of the subject subscriber as input to a T-Digest construction algorithm.

Stated differently, in one or more embodiments, S205 may function to generate a target digital threat score distribution for a subject subscriber. The target digital threat score distribution, in one or more embodiments, may indicate to the digital threat mitigation platform a score distribution preference of the subject subscriber. The score distribution preference, in some embodiments, may indicate a subscriber's risk tolerance or risk profile for one or more types of digital threats and/or digital events. Furthermore, in one or more embodiments, the target digital threat score distribution may be represented by a corresponding T-Digest data structure.

In one or more embodiments, S205 may function to generate a T-Digest data structure of digital threat scores for a subject subscriber based on the digital threat scores (e.g., uncalibrated digital threat scores, etc.) of the subject subscriber that correspond to digital events of a target population, target digital event type, target digital event status (e.g., pending) and/or target timespan. For instance, in a non-limiting example, a subject T-Digest data structure of digital threat scores (e.g., T-digest data structure of uncalibrated digital threat scores) may have been created using only historical digital threat scores (e.g., uncalibrated digital threat scores) of a subject subscriber that correspond to historical login-type digital events of the subject subscriber for a target time span. In another non-limiting example, a subject T-Digest data structure of digital threat scores (e.g., T-digest data structure of uncalibrated digital threat scores) may have been created using only historical digital threat scores (e.g., uncalibrated digital threat scores) of a subject subscriber that correspond to historical order-type digital events of the subject subscriber for a target time span (e.g., past 24 hours, past 5 days, past 7 days, past 10 days, etc.). In another non-limiting example, a subject T-Digest data structure of digital threat scores (e.g., T-digest data structure of uncalibrated digital threat scores) may have been created using only historical digital threat scores (e.g., uncalibrated digital threat scores) of a subject subscriber that correspond to historical content creation-type digital events of the subject subscriber for a target time span (e.g., past 24 hours, past 5 days, past 7 days, past 10 days, etc.).

It shall be recognized that, in one or more embodiments, a subject T-Digest data structure may have been created using only historical digital threat scores (e.g., uncalibrated digital threat scores) of one or more subscribers that correspond to a target subset or group of digital events (e.g., digital transactions with status "Pending").

Generating T-Digest representations of digital threat scores in such a manner provides many technical benefits and advantages, such as computing percentile-based threat scores based on threat score data associated with a specific type or population of digital events rather than relying on all digital threat score data of a subject subscriber.

2.10 Configuring a Digital Event API for Percentile-Based Threat Scoring

S210, which includes configuring a digital event application programming interface, may function to configure or reconfigure a public application programming interface (API) that may be designed to handle inbound digital events. A digital event application programming interface, as generally referred to herein, may provide an interface at which subscribers to the system 100 (i.e., a threat mitigation service or the like) may supply digital event data and, in return, receive a digital threat score and one or more percentile-based threat scores based on the digital event data. It shall be recognized that the digital event application programming interface may be interchangeably referred to herein as an "event application programming interface" and/or the like.

A digital threat score, as generally referred to herein, may range between any two values or a range of characters (e.g., 0-100, A-Z, any range of non-numerical indicators (e.g., green-red, low to high, etc., and the like) that indicates a likely risk or likely threat associated with a subject digital event. It shall be recognized that the digital threat score may be computed in analogous ways as described in U.S. patent application Ser. No. 63/301,938, titled SYSTEMS AND METHODS FOR MACHINE LEARNING-BASED DIGITAL THREAT ASSESSMENTS WITH SECURITY CHALLENGE-INTEGRATED AUTOMATED WORKFLOWS AND TRAINING MACHINE LEARNING MODELS WITH SECURITY CHALLENGE-INFORMED DATA and U.S. patent application Ser. No. 17/963,365, titled SYSTEMS AND METHODS FOR ACCELERATED DETECTION AND REPLACEMENT OF ANOMALOUS MACHINE LEARNING-BASED DIGITAL THREAT SCORING ENSEMBLES AND INTELLIGENT GENERATION OF ANOMALOUS ARTIFACTS FOR ANOMALOUS ENSEMBLES, which are incorporated herein in their entireties by this reference.

A percentile-based threat score, as generally referred to herein, may be a measure (such as a score, a value, or the like) that represents a probable degree of threat or probable risk of a subject digital event (of a subscriber) relative to a distribution of digital threat scores (of the subscriber) over a target period (i.e., last ten (10) days, last five (5) days, previous twenty-four (24) hours, etc.). For instance, in a non-limiting example, a percentile-based threat score of ninety-five (95) computed for a subject digital event may indicate that the subject digital event is riskier than 95% of the digital events observed for the subscriber within the target period. Stated another way, a digital threat score of eighty (80) may correspond to percentile-based threat score of 95% when the digital threat score of eighty (80) is higher than 95% of the digital threat scores for a target period (i.e., last ten (10) days, last five (5) days, previous twenty-four (24) hours, etc.). In another non-limiting example, an uncalibrated digital threat score of eighty (80) may correspond to a percentile-based threat score of 95 when the uncalibrated digital threat score of eighty (80) is higher than 95% of the uncalibrated digital threat scores for a target period (i.e., last ten (10) days, last five (5) days, previous twenty-four (24) hours, etc.)

An uncalibrated digital threat score, in some embodiments, may be a raw digital threat score or value outputted, generated or computed by a threat scoring machine learning model or an ensemble of threat scoring machine learning models. As described in more detail herein, the raw digital threat score may be subsequently calibrated or mapped to a target threat score distribution. It shall be noted that, in some embodiments, a digital threat score may be an uncalibrated digital threat score.

A calibrated digital threat score, in some embodiments, may be a transformed representation of an uncalibrated digital threat score that aligns with a subscriber-preferred threat score distribution. In some embodiments, subscribers may configure automated decisioning thresholds using calibrated digital threat scores.

In one or more embodiments, S210 may function to re-configure a pre-existing digital event application programming interface to accept and process a new type of query parameter related to score stability. In such embodiments, S210 may function to encode the pre-existing digital event application programming interface to accept a new score stability-type query parameter. The score stability-type query parameter, when included in a digital event API request, may instruct the system 100 (i.e., threat mitigation service or the like) to return one or more percentile-based threat scores along with a digital threat score for a subject digital event.

It shall be recognized, in embodiments in which a system or service implementing method 200 does not have a digital event API, S210 may function to configure and implement a digital event-type API that performs in analogous ways as described above.

Figure 12:
FIG. 12 illustrates an example of a graphical user interface displaying digital threat scores and corresponding percentile-based threat scores in accordance with one or more embodiments of the present application.

For instance, as illustrated in the non-limiting example of FIG. 3, the threat mitigation service may function to obtain, from a subscriber, digital event data via a digital event application programming interface request that includes the score stability-type query parameter (i.e., fields=score_percentiles). Accordingly, based on the threat mitigation service receiving the digital event application programming interface request from the subscriber, the threat mitigation service may function to return at least a digital threat score and one or more percentile-based threat scores that indicates a likely threat or likely risk associated with the digital event data, as shown generally by way of example in FIG. 4 and FIG. 12.

Additionally, or alternatively, in one or more embodiments, based on or in response to receiving, via an application programming interface (API), a request from a subscriber to assess a threat of a digital event occurring on an online platform of the subscriber, a system or service implementing method 200 may function to return, to the subscriber, an API response that includes a calibrated digital threat score and one or more percentile-based threat scores computed for the digital event, as described in more detail herein.

2.20 Configuring and Implementing One or More Automated Decisioning Workflows with Percentile-Based Threat Score Thresholding S220, which includes configuring and implementing one or more automated decisioning workflows with percentile-based threat score thresholding, may function to configure a new automated decisioning workflow or re-configure an existing automated decisioning workflow for percentile-based threat score thresholding. An automated decisioning workflow with percentile-based threat score thresholding, as generally referred to herein, may include one or more automated decisioning routes that may be configured to automatically evaluate and respond to a subject inbound digital event based on, at least, one percentile-based threat score computed for the subject inbound digital event. It shall be recognized that an "automated decisioning workflow" may be interchangeably referred to herein as an "automated workflow", a "threat decisioning workflow", and/or the like.

Configuring One or More Automated Decisioning Workflows

In one or more embodiments, using a workflow configuration user interface or the like, S220 may function to configure (or reconfigure) one or more automated decisioning routes of an automated decisioning workflow for percentile-based threat score thresholding, as shown generally by way of example in FIG. 6, FIG. 7, FIG. 8, FIG. 9, and FIG. 10.

Figure 6:
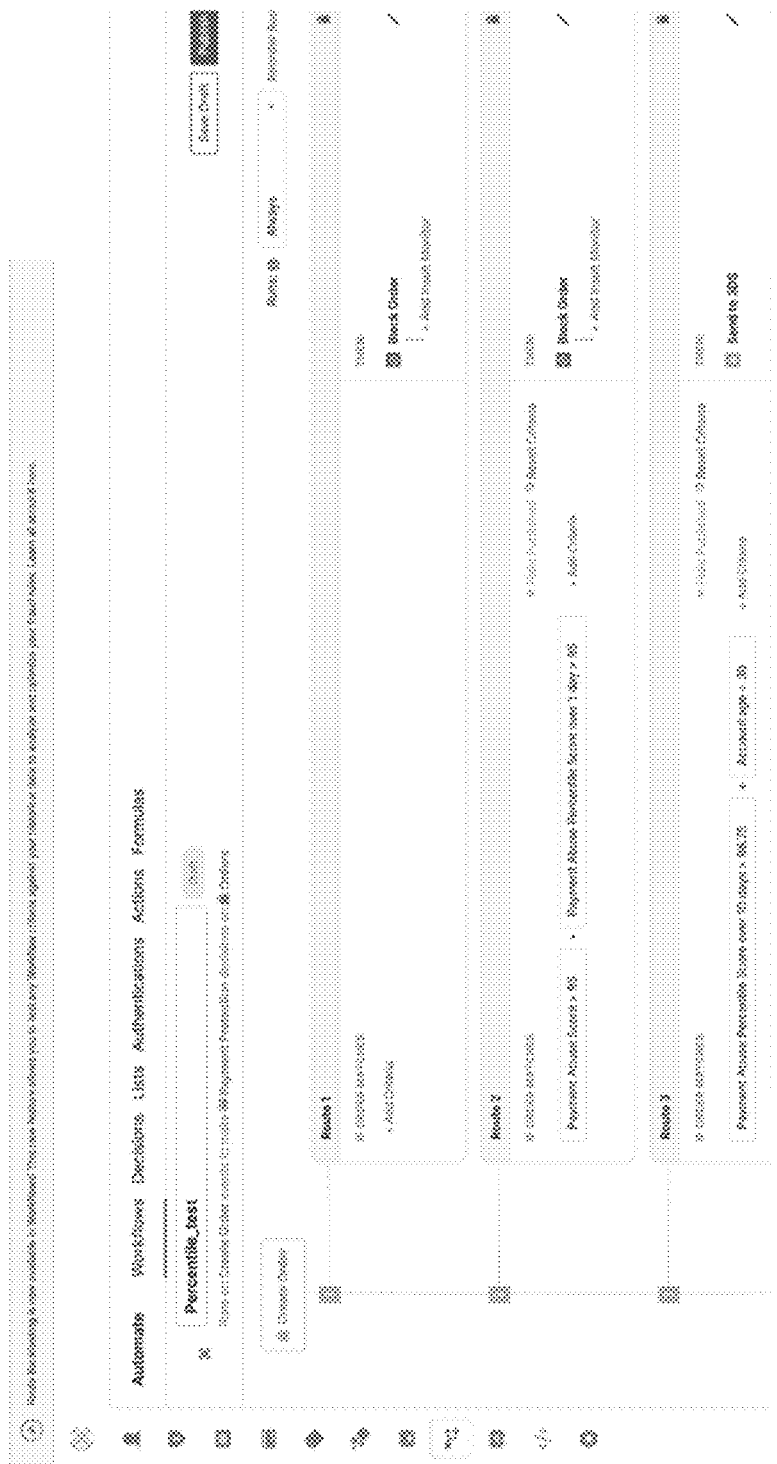
FIG. 6-FIG. 10 illustrates example graphical user interfaces for configuring and implementing an automated decisioning workflow with percentile-based threat score thresholding in accordance with one or more embodiments of the present application.
Figure 7:
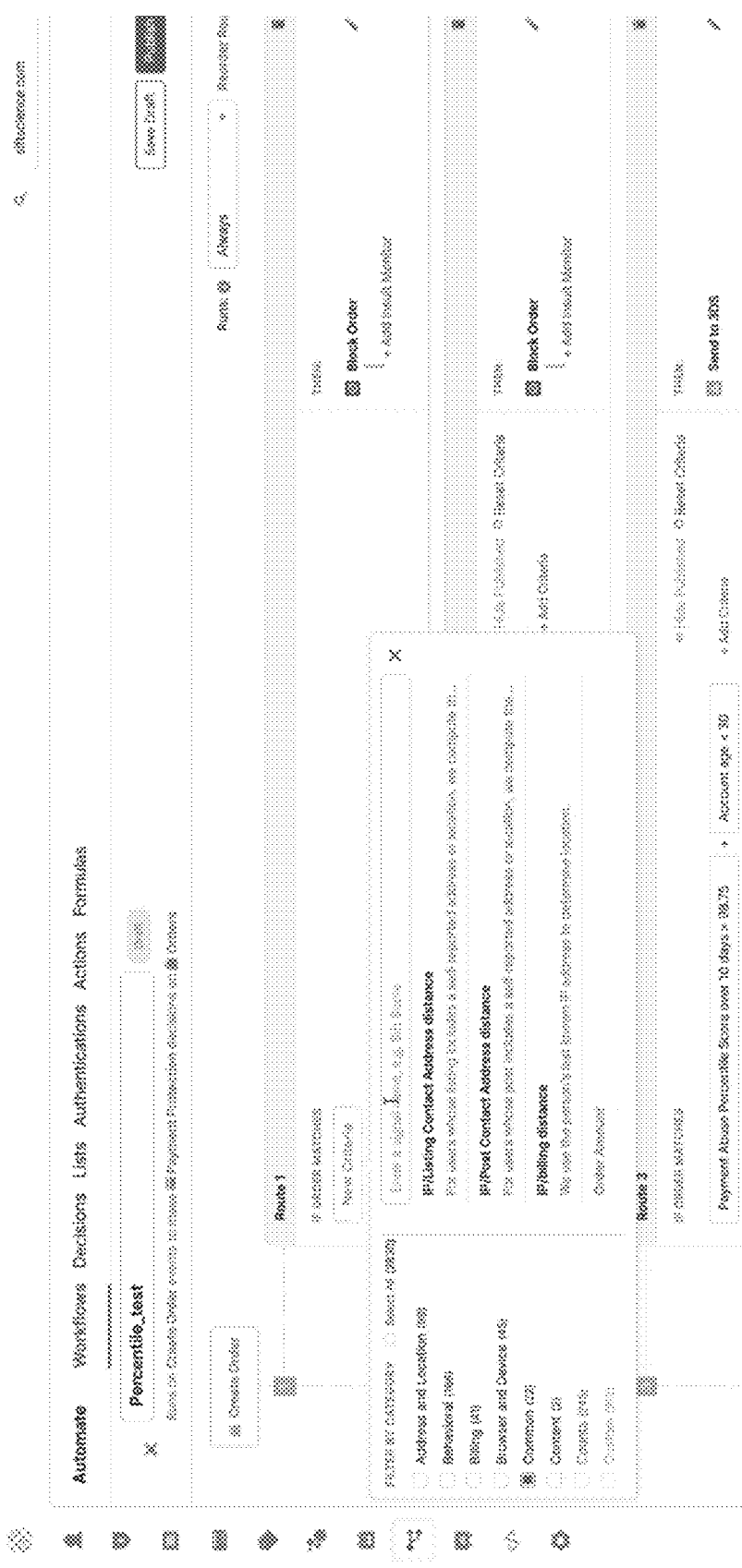
Figure 8:
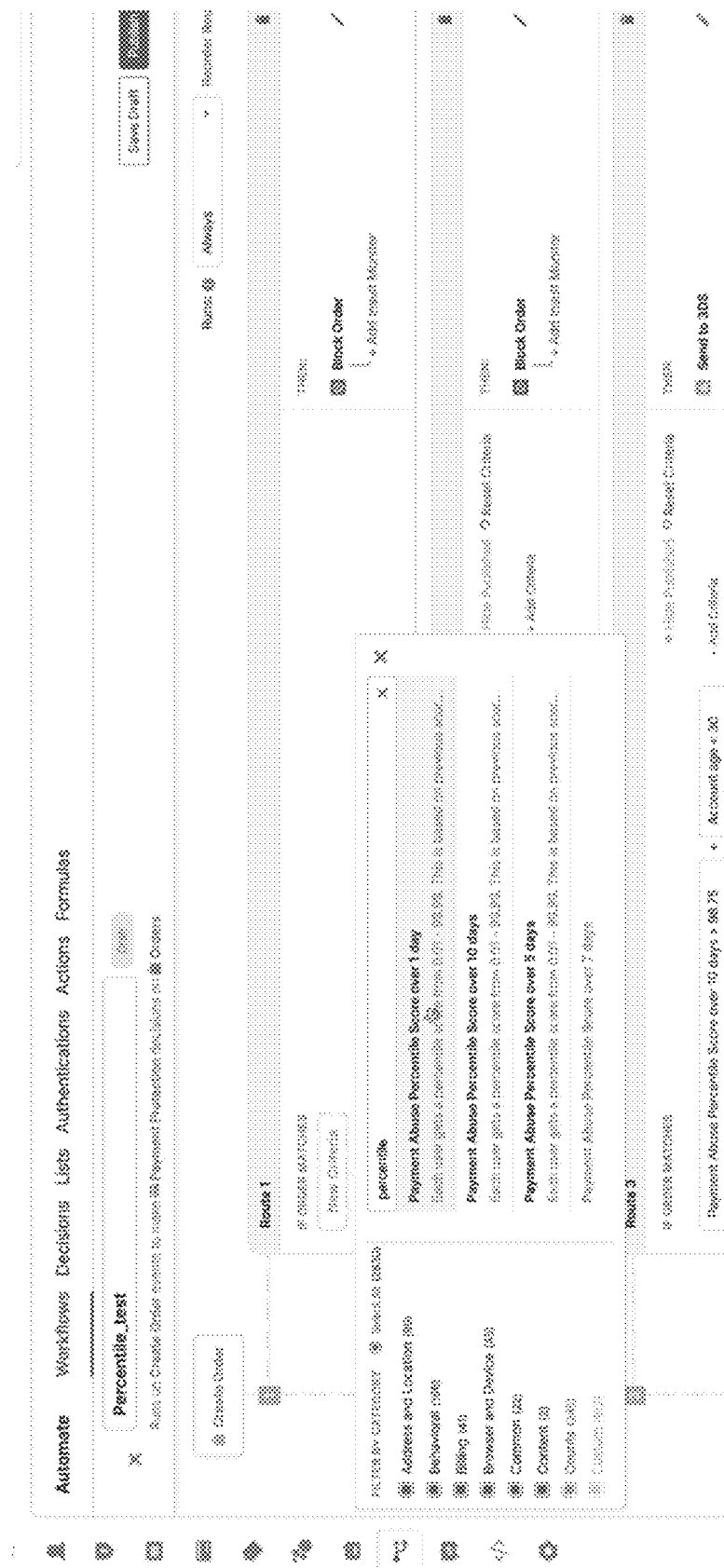
Figure 9:
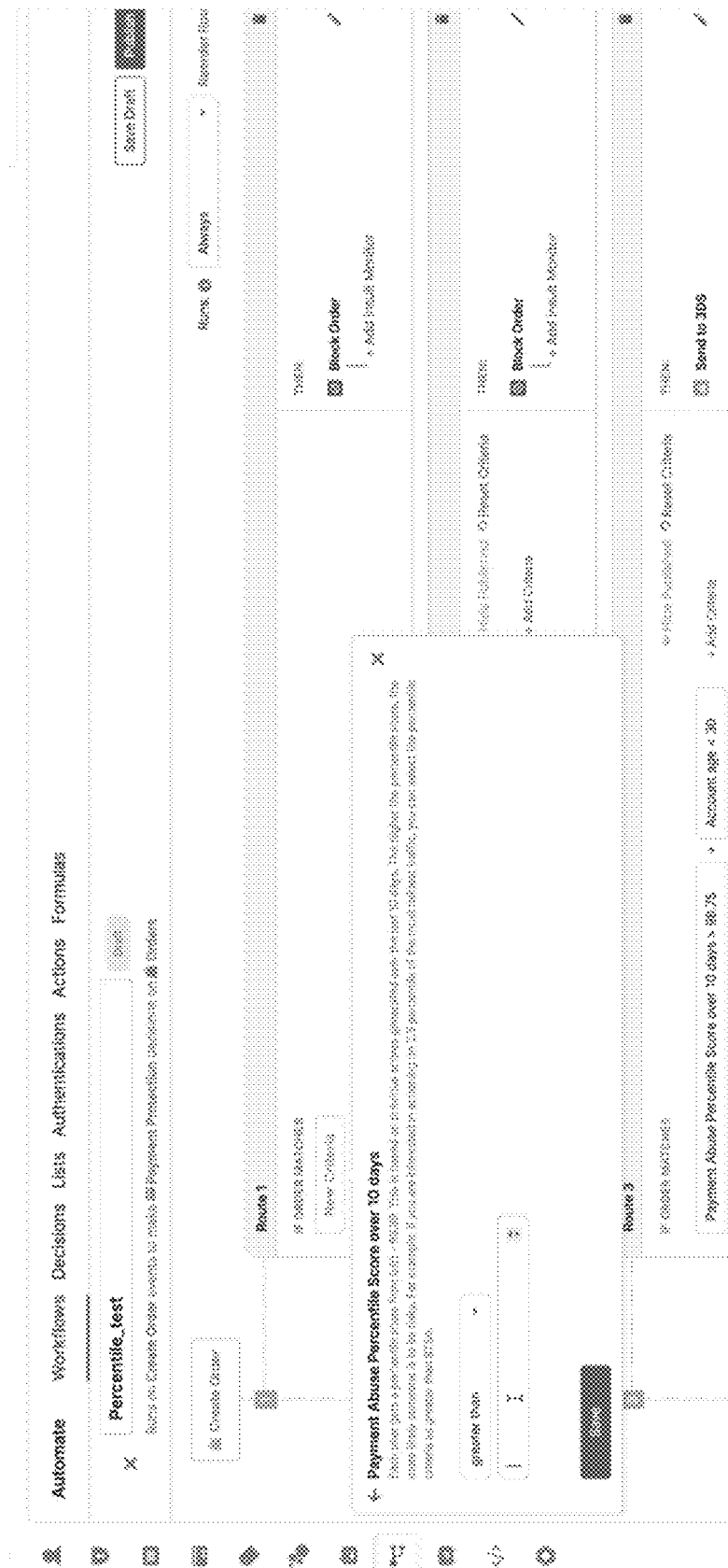

For instance, in the non-limiting example of FIG. 6, the workflow configuration user interface may function to display a target automated decisioning workflow that includes a first automated decisioning route, a second automated decisioning route, and a third automated decisioning route. In such a non-limiting example, the target automated decisioning workflow may be initialized and executed on inbound digital events of a target type (i.e., order-type events). In other words, the threat mitigation service may use the target automated decisioning workflow to automatically evaluate and automatically respond to inbound digital events that correspond to the target type.

In one or more embodiments, an automated decisioning workflow of a subscriber may include an automated decisioning route that may function to automatically block a respective digital event when a given percentile-based threat score of a target time span computed for the respective digital event is greater than a predetermined maximum percentile-based threat score threshold.

Additionally, or alternatively, in one or more embodiments, an automated decisioning workflow of a subscriber may include an automated decisioning route that may function to automatically block a respective digital event when a given percentile-based threat score of a target time span computed for the respective digital event is greater than a predetermined maximum percentile-based threat score threshold and a representation of a digital threat score (e.g., calibrated digital threat score, uncalibrated digital threat score, etc.) computed for the respective digital event is greater than a predetermined maximum score threshold.

Additionally, or alternatively, in one or more embodiments, an automated decisioning workflow of a subscriber may include an automated decisioning route that may function to automatically block a respective digital event when a given percentile-based threat score of a target time span computed for the respective digital event is greater than a predetermined maximum percentile-based threat score threshold and a digital threat score computed for the respective digital event is greater than a predetermined maximum digital threat score threshold.

Additionally, or alternatively, in one or more embodiments, an automated decisioning workflow of a subscriber may include an automated decisioning route that may function to automatically block a respective digital event when a given percentile-based threat score of a target time span computed for the respective digital event is greater than a predetermined maximum percentile-based threat score threshold and a target feature associated with the respective digital event is greater than a predetermined feature threshold.

It shall be further recognized, in one or more embodiments, a subscriber may use the workflow configuration user interface to set or define any suitable T-digest calibrated score threshold (or condition) and/or any suitable percentile-based threat score threshold (or condition) that, when satisfied, automatically blocks, allows, or causes a review of a subject digital event. In other words, subscribers may use the workflow configuration user interface to set or define T-digest calibrated score thresholds (e.g., calibrated score thresholds or the like) and/or percentile-based threat score thresholds that, when satisfied, enables a system or service to execute a target automated action (e.g., a blocking of a subject digital event that satisfies predetermined threshold criteria, an allowance of a subject digital event that satisfies predetermined threshold criteria, a review of a subject digital event that satisfies predetermined threshold criteria, etc.).

(i) Automated Decisioning Route with Percentile-Based Threat Score Thresholding

In one or more embodiments, based on receiving one or more user inputs via the workflow configuration user interface, a percentile-based threat score thresholding criterion may be defined for the first automated decisioning route, as shown generally by way of example in FIGS. 6-10. The percentile-based threat score thresholding criterion, in one or more embodiments, may include a minimum or maximum percentile-based threat score that is defined by a subscriber (or the like) for a specified time span. Thereby, enabling the subscriber, to whom the target automated decisioning workflow corresponds, to maintain a stable friction rate irrespective of score shift or drift, as described in U.S. patent application Ser. No. 17/963,365, titled SYSTEMS AND METHODS FOR ACCELERATED DETECTION AND REPLACEMENT OF ANOMALOUS MACHINE LEARNING-BASED ENSEMBLES AND INTELLIGENT GENERATION OF ANOMALOUS ARTIFACTS FOR ANOMALOUS ENSEMBLES, which is incorporated in its entirety herein.

Figure 10:
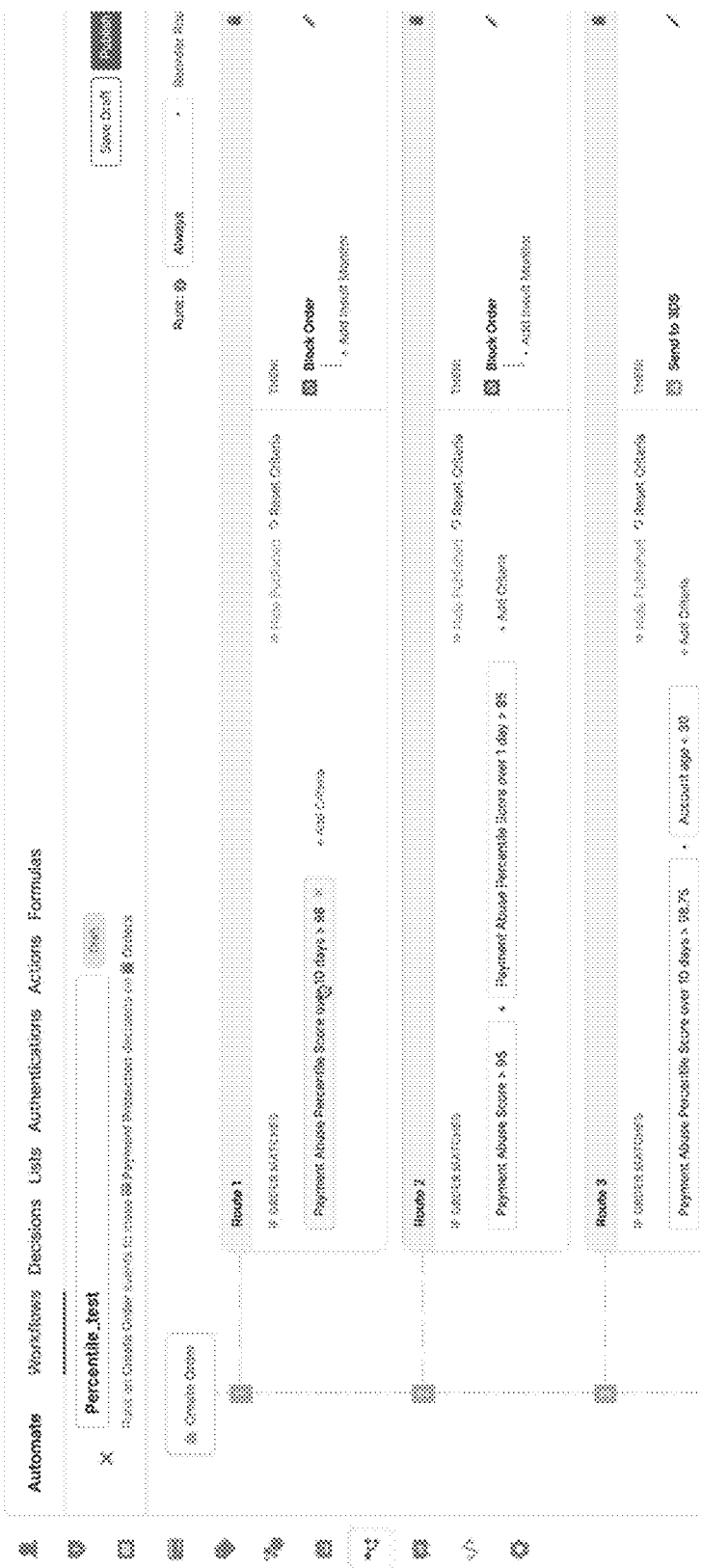

For instance, in a non-limiting example and as generally illustrated in FIG. 10, a subscriber may define, for the first automated decisioning route or the like, a percentile-based threat score threshold of ninety-eight for the last ten days. Accordingly, at least one technical benefit of using percentile-based threat score thresholding within an automated decisioning route may enable a subscriber to maintain a stable block or friction rate irrespective of if digital threat scores fluctuate (or change). It shall be recognized that such fluctuations in digital threat scores may be caused by new model releases, model shift, model drift, and/or the like. In other words, by defining or setting a percentile-based threat score threshold over a target time span, such as ninety-eight for the last ten days, the subscriber may ensure that (e.g., only) the top two percent of the riskiest digital events are automatically blocked.

Stated another way, in one or more embodiments, the first automated decisioning route may be configured to automatically block an order (associated with a subject digital event) from occurring when a percentile-based threat score computed for the subject digital event satisfies the percentile-based threat score thresholding criterion of the first automated decisioning route.

(ii) Automated Decisioning Route with Percentile-Based Threat Score Thresholding+Digital Threat Score Thresholding Additionally, or alternatively, in one or more embodiments, based on receiving one or more user inputs via the workflow configuration user interface, a percentile-based threat score thresholding criterion and a digital threat score thresholding criterion may be defined for the second automated decisioning route, as shown generally by way of example in FIG. 10.

For instance, in a non-limiting example and as generally illustrated in FIG. 10, a subscriber may define, for the second automated decisioning route or the like, a minimum percentile-based threat score thresholding criterion of ninety-five for the last twenty-four hours and a minimum digital threat score thresholding criterion of ninety-five. Accordingly, at least one technical benefit of using both a percentile-based threat score thresholding criterion and/or a digital threat score thresholding criterion (e.g., a calibrated digital threat score thresholding criterion, an uncalibrated digital threat score thresholding criterion, any suitable representation of a digital threat score, etc.) within an automated decisioning route may enable a subscriber to set a maximum to a block rate or a friction rate (or one or more automation outputs of a customer's digital event handling workflow) that may be defined by the percentile-based threat score thresholding criterion while enabling the system to evaluate a level of risk of a subject digital event using the associated raw digital threat score (e.g., uncalibrated digital threat score). In other words, this type of automated decisioning route configuration may accommodate for digital fraud or digital spam attacks that may elevate raw digital threat scores of digital events to higher than normal values over a given period.

Stated another way, in one or more embodiments, the second automated decisioning route may be configured to automatically block an order (associated with a subject digital event) from occurring when a percentile-based threat score computed for the subject digital event satisfies the percentile-based threat score thresholding criterion and a representation of digital threat score (e.g., calibrated digital threat score) computed for the subject digital event satisfies the multiple score thresholding criteria of the second automated decisioning route.

(iii) Automated Decisioning Route with Percentile-Based Threat Score Thresholding+Feature-Level Thresholding Additionally, or alternatively, in one or more embodiments, based on receiving one or more user inputs via the workflow configuration user interface, a percentile-based threat score thresholding criterion and a feature thresholding criterion may be defined for the third automated decisioning route, as shown generally by way of example in FIG. 10.

For instance, in a non-limiting example and as generally illustrated in FIG. 10, a subscriber may define, for the third automated decisioning route or the like, a minimum percentile-based threat score thresholding criterion of ninety-eight and seventy-five hundredths (i.e., 98.75) over the last ten days and a feature thresholding criterion indicating that an account associated with a subject digital event must be less than thirty days old. Accordingly, at least one technical benefit of using both percentile-based threat score thresholding criterion and feature thresholding criterion within an automated decisioning route may enable a subscriber to maintain a stable block or friction rate in analogous ways as described above while also ensuring that a target feature (or attribute) of a subject digital event meets the defined thresholds. In other words, this type of automated decisioning route configuration ensures that a degree of threat of a subject digital event is evaluated not just based in relation to recent digital events and, more specifically, recent digital event threat scores over a given period, but also at least one target feature (or attribute) of the subject digital event (e.g., account age, IP/billing distance, login country, order amount, billing/shipping address do not match, etc.).

Stated another way, in one or more embodiments, the third automated decisioning route or the like may be configured to automatically block an order (associated with a subject digital event) from occurring when a percentile-based threat score computed for the subject digital event satisfies the percentile-based threat score thresholding criterion and a target feature (or attribute) associated with the subject digital event satisfies a feature-level thresholding criterion of the third automated decisioning route.

It shall be recognized that a subscriber or the like may configure an automated decisioning workflow and/or one or more automated decisioning routes with any suitable parameters, criteria, or conditions. This may include, but is not limited to, digital threat score thresholding criterion, percentile-based threat score thresholding criterion, target attributes or target features of digital events, and any other relevant parameters.

Implementing One or More Automated Decisioning Workflows

In one or more embodiments, based on receiving one or more user inputs via the workflow configuration user interface, S220 may function to implement (i.e., publish, deploy, etc.), for a target subscriber, a target automated decisioning workflow that may have been configured using the workflow configuration user interface.

In one or more embodiments, based on receiving one or more user inputs associated with deploying a target automated decisioning workflow, S220 may function to replace, via one or more computers, a currently implemented automated decisioning workflow with the target automated decisioning workflow when the target automated decisioning workflow is a reconfiguration (or modification) of the currently implemented automated decisioning workflow.

Additionally, or alternatively, based on receiving one or more user inputs associated with deploying a target automated decisioning workflow, S220 may function to deploy, via one or more computers, a new automated decisioning workflow for a target subscriber when the new automated decisioning workflow is not a modification or replacement of a currently implemented automated decisioning workflow.

It shall be noted that, in one or more embodiments, an automated decisioning workflow, when implemented, may function to automatically evaluate inbound digital events, and automatically execute an automated disposal decision (i.e., block, allow, review) based on a subject digital event satisfying an automated decisioning route of the automated decisioning workflow, as described in more detail herein.

2.30 Obtaining Digital Event Data

S230, which includes obtaining digital event data, may function to obtain digital event data associated with a target digital event via an application programming interface (i.e., the digital event application programming interface configured in S210). A digital event, as generally referred to herein, may relate to an online event or user action that may occur at or within an online environment of a subject subscriber.

In one or more embodiments, S230 may function to obtain digital event data associated with a digital event based on the digital event occurring at one or more online mediums (i.e., systems, services, etc.) of a subscriber, a service provider, and/or the like to the threat mitigation service. For instance, in a non-limiting example, a digital resource (e.g., system or service) of a subscriber to the threat mitigation service may detect that a digital user may be attempting to perform an online order or transaction (or another type of digital event/activity), and in turn, may transmit, to the threat mitigation service, digital event data corresponding to the online order or transaction using the digital event application programming interface provided by S210.

In one or more embodiments, the digital event data may include, but is not limited to, a type of a subject digital event, a time that a subject digital event occurred, a location of a user involved in a subject digital event, a device used by a user involved in a subject digital event, a type of transaction or order attempted, a value of the transaction or order attempted, and/or any other probative data that may be used to assess a likely threat of a subject digital event.

It shall be recognized that, in or more embodiments, S230 may function to receive digital event data associated with any type of digital event that may occur at a digital resource of a subscriber, such as digital event data relating to a digital account opening, digital login attempts, digital user activity events on an online web page, and/or the like in analogous ways as described above.

It shall be further recognized that, in one or more embodiments, S230 may function to obtain digital event data that corresponds to digital activity or events occurring (i.e., completely) over the web or the Internet. Furthermore, in some embodiments, S230 may function to obtain digital event data that correspond to events and/or activities that occur or are initiated outside of the web or the Internet (i.e., in a physical environment) in which some part of the event and/or activity involves the web or the Internet.

Figure 11:
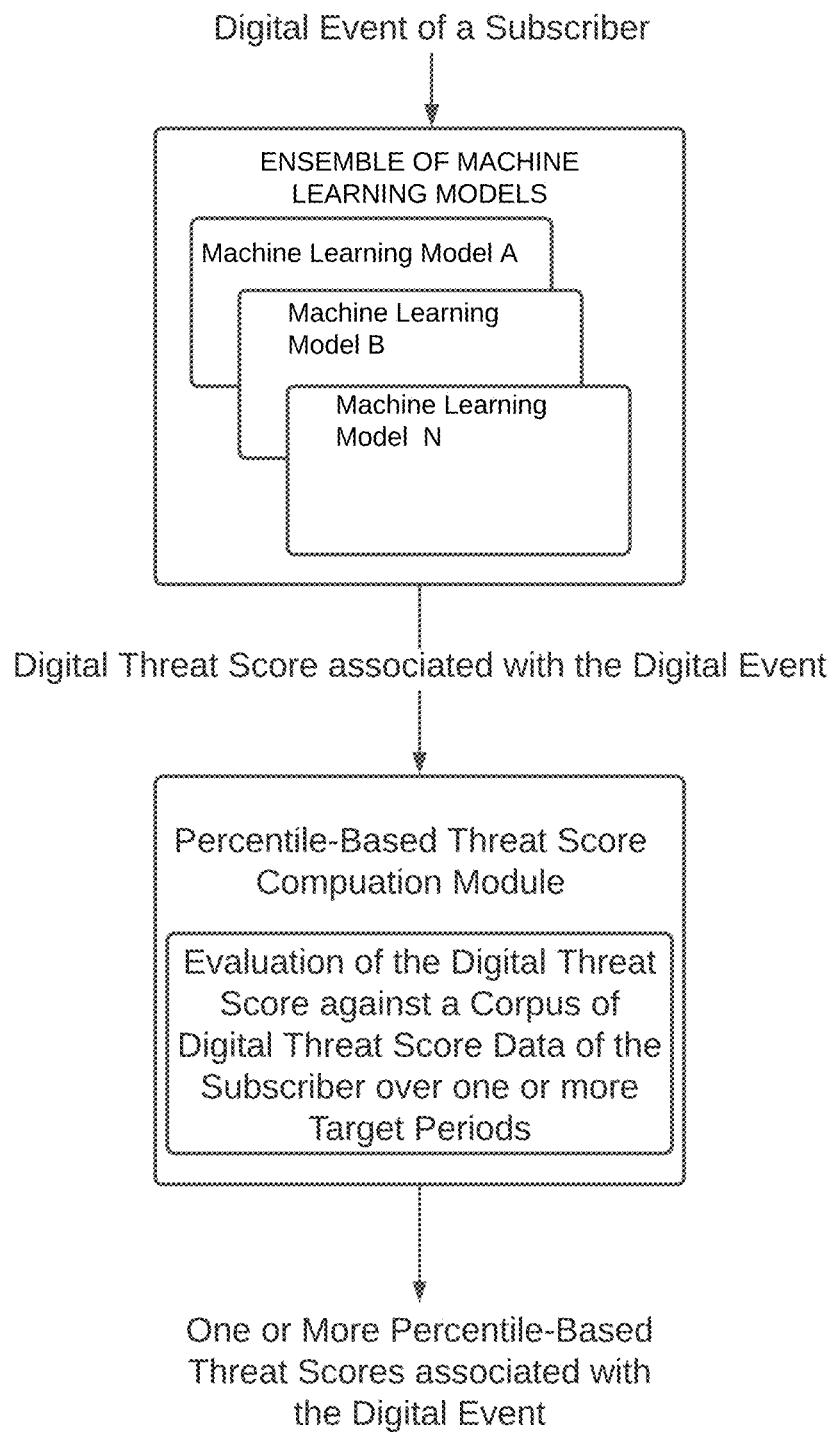
FIG. 11 illustrates an example schematic for computing a digital threat score and one or more percentile-based threat scores for a subject digital event in accordance with one or more embodiments of the present application.

2.40 Computing a Digital Threat Score and One or More Percentile-Based Threat Scores S240, which includes computing digital threat scores and one or more percentile-based threat scores, may function to compute a digital threat score and one or more percentile-based threat scores for each subject digital event obtained by the threat mitigation service, as shown generally by way of example in FIG. 11.

In one or more embodiments, S240 may function to receive a digital event threat evaluation request from a subscriber, via an application programming interface (API) of the threat mitigation service, to evaluate a risk or threat of a subject digital event that may be occurring on an online platform of the subscriber. That is, in some embodiments, a request for a digital threat evaluation may include an API call that may be made from a back-end computing system of a subscriber, via the API (e.g., a RESTful API) of the threat mitigation service, that requests the threat mitigation service to perform one or more of a threat and/or a feature evaluation of a subject digital event associated with one or more online resources of the subscriber.

Computing Digital Threat Scores

In one or more embodiments, S240 may function to pass digital event data associated with a digital event threat evaluation request through a feature extractor to extract one or more sets of features from the digital event data. In such embodiments, S230 may function to provide, as input, the one or more extracted sets of features to an ensemble of one or more machine learning models that may be specifically trained to classify and/or predict a likelihood that an event or activity involves a threat of online fraud or abuse. Accordingly, in response to the ensemble of machine learning models receiving one or more extracted sets of features, S240 may function to generate, using the ensemble of machine learning models, a machine learning-based inference that includes a digital threat score (e.g., an uncalibrated digital threat score, a raw digital threat score, etc.) that indicates a likelihood that a digital event, to which the one or more extracted sets of features correspond, involves a threat of online fraud or abuse. It shall be recognized that the digital threat score (e.g., an uncalibrated digital threat score, a raw digital threat score, etc.) may range between any two values or a range of characters (e.g., 0-100, A-Z, any range of non-numerical indicators or characters (e.g., green to yellow to red, low to intermediate to high, etc.) and the like).

For instance, in a non-limiting example, S240 may function to receive digital event data, from a subscriber, that may be associated with an online transaction attempt from a user using one or more online services of the subscriber (i.e., a service provider or the like). In such a non-limiting example, S240 may function to pass the digital event data through a feature extractor to extract a corpus of probative features. Accordingly, based on the ensemble of machine learning models receiving (e.g., one or more threat scoring machine learning models, a plurality of threat scoring machine learning models, etc.), as input, the corpus of probative features, S240 may function to generate, using the ensemble of machine learning models, a machine learning-based inference that includes a digital threat score (i.e., a high digital threat score may indicate a high likelihood of digital fraud, while a low digital threat score may indicate a low likelihood of digital fraud).

It shall be noted, in one or more embodiments, S240 may function to receive a volume of digital events from one or more subscribers and, in turn, compute a distinct digital threat score (e.g., raw digital threat score, uncalibrated digital threat score, etc.) for each distinct digital event of the volume of digital events in analogous ways as described above.

It shall be further noted, in one or more embodiments, S240 may function to receive a volume of digital events from one or more subscribers and, in turn, compute a distinct uncalibrated digital threat score for each distinct digital event of the volume of digital events using one or more threat scoring machine learning models.

Computing Percentile-Based Threat Scores

Additionally, in one or more embodiments, based on or in response to computing a digital threat score for a subject digital event, S240 may also function to compute one or more percentile-based threat scores for the subject digital event. Each distinct percentile-based threat score, computed by S240, may represent a degree of threat of the subject digital event, relative to a distribution of digital threat scores of a subscriber associated with the subject digital event, over a predetermined time interval. It shall be noted, in one or more embodiments, the distribution of digital threat scores may be represented using a t-digest data structure, as described above.

In one or more embodiments, to compute a percentile-based threat score for a subject digital event based on the digital threat score (e.g., uncalibrated digital threat score) computed for the subject digital event, S240 may function to identify, via one or more computers, a centroid of a plurality of centroids within a target T-digest data structure of historical digital threat scores of the subscriber that is closest to the digital threat score (e.g., uncalibrated digital threat score) and calculate, via the one or more computers, a threat severity percentile of the digital threat score (e.g., uncalibrated digital threat score) based on interpolating a percentile position of the digital threat score (e.g., uncalibrated digital threat score) using the centroid and one or more neighboring centroids that are within a predetermined proximity to the centroid (e.g., satisfying a minimum predetermined proximity threshold). It shall be recognized, in one or more embodiments, each centroid of the plurality of centroids may include a mean digital threat score that indicates an average value of all digital threat scores within a respective centroid, a digital threat score count that indicates a total number of digital threat scores aggregated within the respective centroid, and a cumulative digital threat score count that indicates a total number of digital threat scores in the respective centroid and all preceding centroids having a respective mean digital threat score less than mean digital threat score of the respective centroid.

In one or more embodiments, S240 may function to compute a percentile-based threat score over a plurality of distinct time spans for a subject digital event. The computation, in one or more embodiments, may be based on or in response to computing a digital threat score for the subject digital event. It shall be noted that, in some embodiments, the percentile-based threat score may be calculated using the formula "(number of digital threat scores below a subject digital threat score for a target time span divided by a total number of digital threat scores observed within the target time span)*100", which represents the percentage of digital threat scores lower than the subject digital threat score. In one or more alternative embodiments, S240 may function to compute a percentile-based threat score over a plurality of distinct time spans for a subject digital event using one or more T-Digest digital threat score distribution representations (e.g., one or more T-Digest data structures of uncalibrated digital threat scores) of a subscriber to which the subject digital event corresponds.

For instance, in a non-limiting example, S240 may function to compute a digital threat score (e.g., uncalibrated digital threat score) of 89.8391231245 for a subject digital event of a subscriber and, in turn, using the digital threat score (e.g., uncalibrated digital threat score) as a basis, S240 may function to compute a distinct percentile-based threat score for multiple distinct time spans, such as the past twenty-four hours, the past five days, the past seven days, and the past ten days. In such a non-limiting example, the percentile-based threat scores may be 98.456721 for the percentile-based threat score that corresponds to the past twenty-four hours, 97.544325 for the percentile-based threat score that corresponds to the past five days, 97.515456 for the percentile-based threat score that corresponds to the past seven days, and 96.773876 for the percentile-based threat score that corresponds to the past ten days.

In other words, the percentile-based threat score may represent a position of the digital threat score within a distribution of digital threat scores (i.e., a T-Digest digital threat score distribution, a T-Digest data structure of uncalibrated digital threat scores, etc.) observed over a target period of the subscriber. For instance, in a non-limiting example, a percentile-based threat score of 98.456721 computed for a subject digital event (of a subscriber) for the past 24 hours may mean that the digital threat score (e.g., uncalibrated digital threat score, etc.) computed for the subject digital event is riskier than 98.456721% of all digital threat scores (e.g., all uncalibrated digital threat scores, all uncalibrated digital threat scores of a target population of digital events, all uncalibrated digital threat scores within a selective subset of digital events, etc.) computed for the subscriber's digital events in the past 24 hours (i.e., the subject digital event is riskier than 98.456721% of all the digital events or a target subset of digital events observed from the subscriber in the past 24 hours). Similarly, a percentile-based threat score of 97.544325 computed for a subject digital event (of a subscriber) for the past 5 days may mean that the digital threat score (e.g., uncalibrated digital threat score) computed for the subject digital event is riskier than 97.544325% of all digital threat scores (e.g., all uncalibrated digital threat scores, all uncalibrated digital threat scores of a target population of digital events, all uncalibrated digital threat scores within a selective subset of digital events, etc.) computed for the subscriber's digital events in the past 5 days (i.e., the subject digital event is riskier than 97.544325% of all the digital events or a target population of digital events observed from the subscriber in the past 5 days).

Additionally, or alternatively, a population of digital events that may be sourced when calculating percentile-based threat scores for a given subscriber may be configurable to elect one or more distinct subsets, recent-in-time, and/or similar type of digital events. That is, in one or more embodiments, S240 may function to selectively identify the population of digital events associated with a given subscriber as the inputs for computing the percentile-based threat scores. As a non-limiting example, upon receipt of a subscriber request, e.g., create order, a system or service implementing method 200 may generate raw digital event threat scores and/or percentile-based threat scores that considers a subset or a selected set (e.g., create order scores) of the population of digital events of the subscriber for comparison and the generation of percentile-based threat scores.

Accordingly, in one or more embodiments, a population of digital events that may be used or selected for calculating percentile-based threat scores may be highly configurable. In this way, not all digital events available for the given subscriber may be used but an intelligent selection of a population of digital events may be identified for associated percentile score computations.

It shall be recognized that each distinct percentile-based threat score, computed by S240, may represent a degree of threat of the subject digital event, relative to a distribution of digital threat scores of the subscriber to which the subject digital event corresponds, over a target time span. In other words, each percentile-based threat score, computed for a subject digital event of a subscriber, may provide a quantifiable measure of a risk (or threat) associated with the subject digital event, relative to the distribution of digital threat scores (e.g., a distribution of uncalibrated digital threat scores, a distribution of calibrated digital threat scores, etc.) of the subscriber over a specific time period (i.e., a percentile-based threat score may rank the subject digital event within the context of all digital events or a selective subset of digital events from the subscriber within the given time period). For example, a percentile-based threat score of ninety-five may indicate that the subject digital event is riskier than ninety-five percent of the digital events observed for the subscriber in the target period.

Stated another way, in one or more embodiments, for each digital event obtained by the threat mitigation service, S240 may function to compute an absolute threat risk of a subject digital event as represented by the digital threat score (e.g., calibrated digital threat score, uncalibrated digital threat score, etc.) and a relative threat risk of the subject digital event as represented by the one or more percentile-based threat scores. At least one technical benefit of computing a digital threat score and one or more percentile-based threat scores may provide a method for the threat mitigation service and/or a subscriber to interpret a threat of a subject digital event in various ways.

It shall be recognized that S240 may function to compute percentile-based threat score for other time spans without departing from the scope of the disclosure.

Additionally, or alternatively, in one or more embodiments, based on or in response to receiving a request from a subscriber to assess a threat of a digital event occurring on an online platform of the subscriber, S240 may function to compute, using one or more threat scoring machine learning models, a digital threat inference based on one or more corpora of feature vectors extracted from digital event data associated with or corresponding to the digital event. In such embodiments, the digital threat inference may include a digital threat score (e.g., an uncalibrated digital threat score) that may indicate a likelihood that the digital event is a fraudulent digital event.

Additionally, in such embodiments, S240 may function to retrieve, from a computer database, a T-Digest data structure of historical digital threat scores of the subscriber based on querying the database using an identifier (e.g., subscriber ID or the like) of the subscriber as a search parameter. Accordingly, in response to retrieving the T-Digest data structure of historical digital threat scores of the subscriber, S240 may function to compute, using the T-Digest data structure of historical digital threat scores of the subscriber, a percentile-based threat score based on the digital threat score (e.g., uncalibrated digital threat score) computed for the digital event. The percentile-based threat score, in one or more embodiments, may indicate a threat severity percentile of the digital threat score (e.g., uncalibrated digital threat score)

relative to historical digital threat scores of the subscriber for a target time span (e.g., past 24 hours, past 5 days, past 7 days, past 10 days, etc.).

It shall be recognized that, in such embodiments, the threat severity percentile may indicate a percentile ranking or percentile position of the digital threat score (e.g., uncalibrated digital threat score) relative to historical digital threat scores of the subscriber.

It shall be further recognized, in such embodiments, the digital event occurring on the online platform of the subscriber may correspond to one of a plurality of predetermined digital event types defined by the digital threat mitigation platform and, in turn, the T-Digest data structure of historical digital threat scores of the subscriber may have been created using only historical digital threat scores (e.g., uncalibrated digital threat scores) that correspond to historical digital events of a same digital event type as the digital event. For instance, in a non-limiting example, the digital event may correspond to a create order event type and the T-Digest data structure of historical digital threat scores of the subscriber may have been created using only historical digital threat scores (e.g., uncalibrated digital threat scores) of the subscriber that correspond to previous create-order type digital events of the subscriber for a predetermined time span (e.g., past 24 hours, past 5 days, past 7 days, past 10 days, etc.). In another non-limiting example, the digital event may correspond to a login event type and the T-Digest data structure of historical digital threat scores of the subscriber may have been created using only historical digital threat scores (e.g., uncalibrated digital threat scores) of the subscriber that correspond to previous login-type digital events of the subscriber for a predetermined time period (e.g., past 24 hours, past 5 days, past 7 days, past 10 days, etc.).

It shall be further recognized, in one or more embodiments, a system or service implementing method 200 may function to create a T-digest representation of digital threat scores using any suitable subset of digital event traffic associated with the system or service implementing method 200. For instance, in a non-limiting example, a T-Digest data structure of historical digital threat scores may have been created based on digital events that correspond to transactions having a target status (e.g., pending, etc.).

Additionally, or alternatively, in one or more embodiments, a system or service implementing method 200 may function to compute, generate, or convert an uncalibrated digital threat score computed for a subject digital event to a calibrated digital threat score (e.g., T-digest calibrated score or the like) that corresponds to a subscriber-preferred score distribution. In such embodiments, the system or service implementing method 200 may use multiple t-digest data structures, as described in more detail herein.

For instance, in a non-limiting example, in response to a system or service implementing method 200 receiving a digital event, the system or service implementing method 200 may function to use a threat scoring machine learning model to compute a raw digital threat score (e.g., uncalibrated digital threat score) based on one or more corpora of feature vectors extracted from digital event data associated with the digital event. In such a non-limiting example, the system or service implementing method 200 may function to calibrate or map the raw digital threat score (e.g., uncalibrated digital threat score) to a calibrated digital threat score (e.g., T-digest calibrated score).

In such a non-limiting example, a system or service implementing method 200 may function to obtain, via one or more computers, one or more datasets of uncalibrated historical digital threat scores computed by the threat scoring machine learning model for a target time span and/or target subscriber. Accordingly, in such embodiments, based on obtaining the one or more datasets of uncalibrated historical digital threat scores, the system or service implementing method 200 may function to generate a source T-Digest data structure of uncalibrated digital threat scores based on providing the one or more datasets of uncalibrated digital threat scores to a T-digest construction algorithm in analogous ways as described above. The source T-Digest data structure, in one or more embodiments, may represent a distribution of historical digital threat scores computed by the threat scoring machine learning model for the target subscriber without any calibration or adjustment.

Accordingly, in such a non-limiting example, based on computing the raw digital threat score (e.g., uncalibrated digital threat score) for the digital event, the system or service may use the source T-Digest data structure of uncalibrated digital threat scores to compute a percentile position or percentile rank of the raw digital threat score in relation to the one or more datasets of uncalibrated historical digital threat scores used in creating the source T-Digest data structure of uncalibrated digital threat scores. For instance, in a non-limiting example, the raw digital threat score computed for the digital event may be eighty (80) and the corresponding percentile of the raw digital threat score may be in the nintieth percentile (e.g., ranks above 90% of the historical digital threats experienced by the subscriber).

Additionally, in such a non-limiting example, each subscriber to the digital threat mitigation service may have a target threat score distribution that indicates to the digital threat mitigation platform a preferred score distribution preference of the subscriber. Thus, in one or more embodiments, the system or service implementing method 200 may function to identify the target digital threat score distribution of the subscriber that corresponds to the digital event (e.g., the target digital threat distribution may be represented in a T-digest data structure format). In such embodiments, the system or service may traverse the target digital threat score distribution to identify the digital threat score that is equivalent to or corresponds to the percentile position or rank of the raw digital threat score. In other words, the system or service may function to identify, within the target digital threat score distribution, a digital threat score that corresponds to the same percentile position as the raw digital threat score. For instance, with continued reference to the above non-limiting example, if the raw digital threat score corresponds to the nintieth percentile in the uncalibrated digital threat score distribution (e.g., the source T-Digest data structure of uncalibrated digital threat scores), the system or service may function to identify the equivalent digital threat score within the target digital threat score distribution that corresponds to the nintieth percentile, which may be 92 (e.g., the digital threat score of ninety-two (92) may be the calibrated digital threat score).

Additionally, or alternatively, in one or more embodiments, one or more of the threat scoring machine learning models described above may include a cohort threat scoring machine learning model. In such embodiments, a system or service may function to obtain, via one or more computers, a training corpus of labeled digital event data samples associated with a plurality of distinct subscribers to the digital threat mitigation platform. The training corpus of labeled digital event data samples may include a distinct set of labeled digital event data samples for each distinct subscriber of the plurality of distinct subscribers, and the plurality of distinct subscribers defines a cohort (e.g., all subscribers operating in the food industry, all subscribers operating in the logistics industry, etc.). Accordingly, in one or more embodiments, the system or service may function to configure the cohort threat scoring machine learning model based on a training of a machine learning model using the training corpus of labeled digital event data samples.

It shall be noted that, in one or more embodiments, a system or service implementing method 200 may function to create a T-digest data structure of uncalibrated digital threat scores and calibrate digital threat scores outputted by the cohort threat scoring machine learning model in analogous ways as described above.

2.50 Computing an Automated Disposal Decision Using an Automated Decisioning Workflow S250, which includes computing an automated disposal decision using an automated decisioning workflow, may function to compute, using an automated decisioning workflow, a distinct automated disposal decision for a subject digital event based on a digital threat score and/or one or more percentile-based threat scores of the subject digital event.

Figure 5:
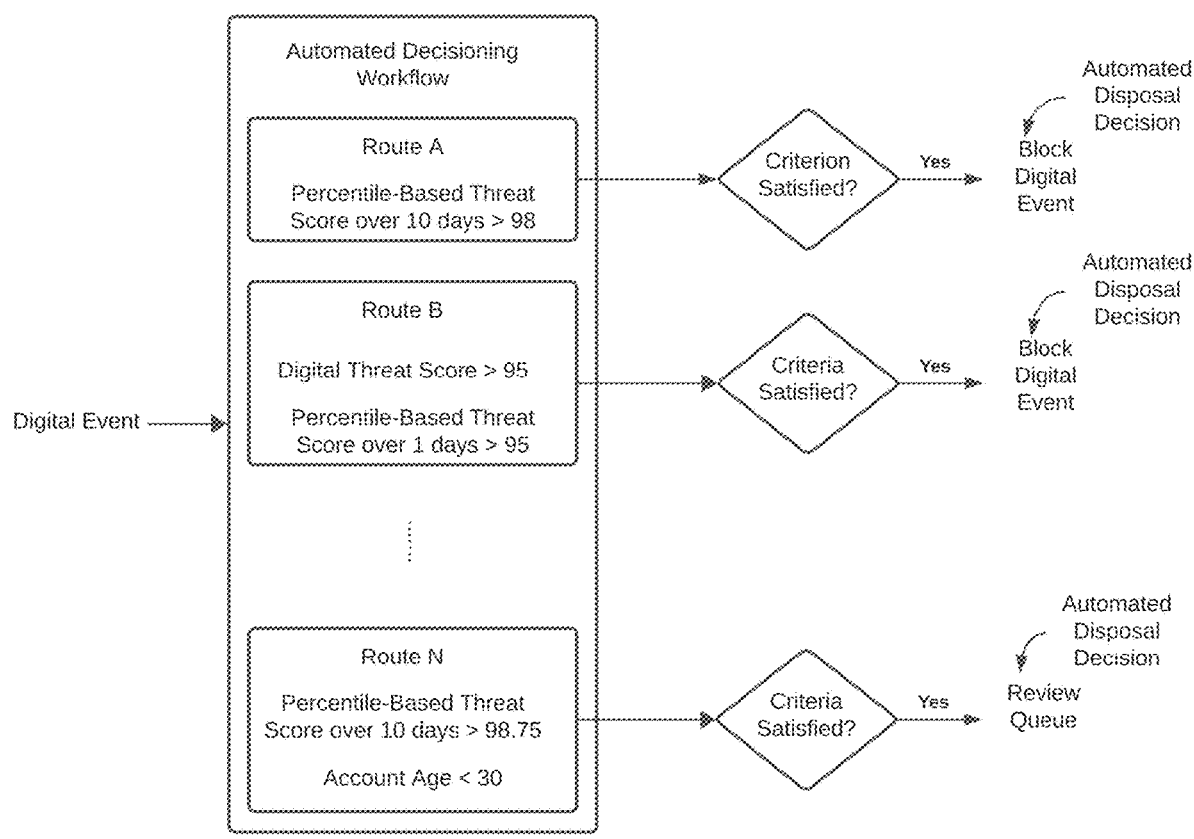
FIG. 5 illustrates an example schematic for using an automated decisioning workflow with percentile-based threat score thresholding in accordance with one or more embodiments of the present application.

In one or more embodiments, an automated disposal decision computed and/or identified for a subject digital event may be the result of satisfying an automated decisioning route within an automated decisioning workflow, as shown generally by way of example in FIG. 5. For instance, in a non-limiting example, the automated disposal decision may encompass actions such as blocking an order, approving an order, banning an account, routing a user/order to a review queue, initiating a user verification process, preventing content from being posted to a website, allowing content to be posted to a website, among other actions, but is not limited to these examples.

In one or more embodiments, S250 may function to execute an automated decisioning decision associated with an automated decisioning route of an automated decisioning workflow based on determining that the conditions and/or parameters of the automated decisioning route are satisfied. In such embodiments, when a representation of a digital threat score (e.g., calibrated digital threat score, uncalibrated digital threat score, etc.) and a percentile-based threat score of a subject digital event satisfies the thresholding scoring criteria defined for a particular automated decisioning route, S250 may function to execute the corresponding automated disposal decision (i.e., block, allow, review, etc.).

For instance, in a non-limiting example, a digital user may be attempting to perform an online digital event, and the digital event data associated with the digital event may be transmitted to the threat mitigation service via the digital event application programming interface. Upon receiving the digital event data, the threat mitigation service may function to compute a digital threat score and a plurality of distinct percentile-based threat scores for the digital event over multiple time spans, such as the past 24 hours, past 5 days, past 7 days, and past 10 days.

For instance, in a non-limiting example, a digital user may be attempting to perform a digital event (i.e., an order). The digital event data associated with the digital event may be transmitted to the threat mitigation service via the digital event application programming interface. Upon receiving the digital event data, the threat mitigation service may function to compute a digital threat score and/or one or more distinct percentile-based threat scores for the digital event over multiple time spans, such as the past 24 hours, past 5 days, past 7 days, and past 10 days, as described above.

In such a non-limiting example, S250 may evaluate the digital threat score and the one or more distinct percentile-based threat scores associated with the digital event against conditions and parameters of one or more automated decisioning routes defined within at least one automated decisioning workflow of the subscriber to which the digital event corresponds. For instance, one automated decisioning route of the at least one automated decisioning workflow may be configured to automatically block a digital event (i.e., an order or the like) when the digital threat score (of a subject digital event of the subscriber) is above 85 and the percentile-based threat score (of the subject digital event of the subscriber) for the past 24 hours is above 98. Accordingly, when a digital threat score and a percentile-based threat score of an inbound digital event satisfies the automated decisioning route of the at least one automated decisioning workflow, S250 may function to compute an automated disposal decision to block the transaction and, in turn, the threat mitigation service may function to automatically block the digital event, effectively preventing malicious activity from occurring.

Stated another way, in one or more embodiments, S250 may function to execute an automated disposal decision computed for a corresponding digital event based on at least a percentile-based threat score satisfying automated decisioning instructions (e.g., an automated decisioning workflow) of the subscriber that corresponds to the digital event.

It shall be further recognized, in one or more embodiments, based on receiving a request from a subscriber to assess a threat of a digital event occurring on an online platform of the subscriber, the system or service implementing method 200 may function to retrieve, from a computer database, one or more T-Digest data structures of historical digital threat scores of the subscriber based on querying the database using an identifier of the subscriber as a search parameter. Accordingly, in such embodiments, the system or service may function to compute, using the one or more T-Digest data structures of historical digital threat scores, a plurality of percentile-based threat scores based on the digital threat score (e.g., uncalibrated digital threat score) computed for the digital event (e.g., each percentile-based threat score of the plurality of percentile-based threat scores indicates a threat severity percentile of the digital threat score relative to historical digital threat scores of the subscriber for a distinct time span).

For example, in one or more embodiments, the system or service may function to retrieve a first T-Digest data structure that represents a distribution of digital threat scores of the subscriber that occurred within a first time span (e.g., past 24 hours), a second T-Digest data structure that represents a distribution of digital threat scores of the subscriber that occurred within a second time span (e.g., past five days), a third T-Digest data structure that represents a distribution of digital threat scores of the subscriber that occurred within a third time span (e.g., past seven days), and a fourth T-Digest data structure that represents a distribution of digital threat scores of the subscriber that occurred within a fourth time span (e.g., past 10 days).

Accordingly, in such embodiments, the system or service may function to compute, using the first T-Digest data structure, a first percentile-based threat score that indicates the threat severity percentile of the digital threat score within the distribution of digital threat scores of the subscriber of the first time span. Additionally, in such embodiments, the system or service may function to compute, using the second T-Digest data structure, a second percentile-based threat score that indicates the threat severity percentile of the digital threat score within the distribution of digital threat scores of the subscriber of the second time span. Additionally, in such embodiments, the system or service may function to compute, using the third T-Digest data structure, a third percentile-based threat score that indicates the threat severity percentile of the digital threat score within the distribution of digital threat scores of the subscriber of the third time span. Additionally, in such embodiments, the system or service may function to compute, using the fourth T-Digest data structure, a fourth percentile-based threat score that indicates the threat severity percentile of the digital threat score within the distribution of digital threat scores of the subscriber of the fourth time span.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for quantile-based assessment and handling of digital events in a digital threat mitigation platform, the method comprising:
   receiving, via an application programming interface (API), a request from a subscriber to assess a threat of a digital event occurring on an online platform of the subscriber;
   computing, using one or more threat scoring machine learning models, a digital threat inference based on one or more corpora of feature vectors extracted from digital event data associated with the digital event, wherein:
      the digital threat inference includes an uncalibrated digital threat score that indicates a likelihood that the digital event is a fraudulent digital event;
   retrieving, from a database, a T-Digest data structure of historical digital threat scores of the subscriber based on querying the database using an identifier of the subscriber as a search parameter;
   computing, using the T-Digest data structure of historical digital threat scores, a percentile-based threat score based on the uncalibrated digital threat score computed for the digital event, wherein:
      the percentile-based threat score indicates a threat severity percentile of the uncalibrated digital threat score relative to historical digital threat scores of the subscriber for a target time span; and
   executing an automated disposal decision computed for the digital event based on at least the percentile-based threat score satisfying automated decisioning instructions of the digital threat mitigation platform.

2. The computer-implemented method according to claim 1, wherein:
   the threat severity percentile indicates a percentile ranking or percentile position of the uncalibrated digital threat score of the digital event relative to the historical digital threat scores of the subscriber.

3. The computer-implemented method according to claim 1, wherein:
   the digital event corresponds to one of a plurality of predetermined digital event types defined by the digital threat mitigation platform, and
   the T-Digest data structure of historical digital threat scores of the subscriber was created using only historical digital threat scores of the subscriber that correspond to historical digital events of a same digital event type as the digital event.

4. The computer-implemented method according to claim 1, wherein:
   computing the percentile-based threat score includes:
      (a) identifying, via one or more computers, a centroid of a plurality of centroids within the T-Digest data structure of historical digital threat scores that is closest to the uncalibrated digital threat score; and
      (b) calculating, via the one or more computers, the threat severity percentile of the digital threat score based on interpolating a percentile position of the uncalibrated digital threat score using the centroid and one or more neighboring centroids, wherein each neighboring centroid of the one or more neighboring centroids is within a predetermined proximity to the centroid.

5. The computer-implemented method according to claim 1, further comprising:
   sourcing, via one or more computers, one or more corpora of uncalibrated historical digital threat scores computed by the one or more threat scoring machine learning models for the subscriber; and generating, via the one or more computers, the T-Digest data structure of historical digital threat scores of the subscriber based on providing the one or more corpora of uncalibrated historical digital threat scores of the subscriber as input to a T-Digest construction algorithm, wherein the T-Digest construction algorithm includes a set of computer-executable instructions that, when executed, executes an automated sequence of tasks that creates the T-Digest data structure of historical digital threat scores of the subscriber.

6. The computer-implemented method according to claim 5, wherein:

the automated sequence of tasks include:
  initializing, via the one or computers, an empty T-Digest data structure; and
  generating a plurality of digital threat score-based centroids based on inserting each uncalibrated historical digital threat score of the one or more corpora of uncalibrated historical digital threat scores into the empty T-Digest data structure.

7. The computer-implemented method according to claim 1, wherein:

the one or more threat scoring machine learning models includes a cohort threat scoring machine learning model, and the computer-implemented method further comprising:
  obtaining a training corpus of labeled digital event data samples associated with a plurality of distinct subscribers to the digital threat mitigation platform, wherein:
    (1) the training corpus of labeled digital event data samples includes a distinct set of labeled digital event data samples for each distinct subscriber of the plurality of distinct subscribers, and
    (2) the plurality of distinct subscribers defines a cohort; and
  configuring the cohort threat scoring machine learning model based on a training of a machine learning model using the training corpus of labeled digital event data samples.

8. The computer-implemented method according to claim 7, further comprising:

sourcing, via one or more computers, a dataset of uncalibrated digital threat scores computed by the cohort threat scoring machine learning model for a predetermined time period;

generating a source T-Digest data structure of uncalibrated digital threat scores based on providing the dataset of uncalibrated digital threat scores to a T-Digest construction algorithm, wherein the T-Digest construction algorithm includes a set of computer-executable instructions that, when executed, executes an automated sequence of tasks that creates the source T-Digest data structure of uncalibrated digital threat scores.

9. The computer-implemented method according to claim 8, further comprising:

identifying a target digital threat score distribution defined by the subscriber, wherein:
  the target digital threat score distribution indicates to the digital threat mitigation platform a score distribution preference of the subscriber, and
  the target digital threat score distribution is represented by a corresponding T-Digest data structure; and calibrating the uncalibrated digital threat score to a calibrated digital threat score using the source T-Digest data structure of uncalibrated digital threat scores and the target digital threat score distribution.

10. The computer-implemented method according to claim 9, wherein:

calibrating the uncalibrated digital threat score to the calibrated digital threat score includes:
  (a) computing, using the source T-Digest data structure of uncalibrated digital threat scores, an uncalibrated percentile score that corresponds to the uncalibrated digital threat score, wherein the uncalibrated percentile score indicates a percentile position of the uncalibrated digital threat score relative to other uncalibrated digital threat scores within the source T-Digest data structure of uncalibrated digital threat scores, and
  (b) identifying, within the target digital threat score distribution, the calibrated digital threat score based on traversing the target digital threat score distribution using the uncalibrated percentile score, wherein the calibrated digital threat score corresponds to a same percentile position as the uncalibrated percentile score.

11. The computer-implemented method according to claim 9, further comprising:

in response to receiving the request from the subscriber to assess the threat of the digital event:
  transmitting an API response to the subscriber that includes the calibrated digital threat score and the percentile-based threat score associated with the digital event.

12. A computer-implemented method for quantile-based assessment and handling of digital events in a digital threat mitigation platform, the method comprising:

receiving, via an application programming interface (API), a request from a subscriber to assess a threat of a digital event occurring on an online platform of the subscriber;

computing, using one or more threat scoring machine learning models, a digital threat inference based on one or more corpora of feature vectors extracted from digital event data associated with the digital event, wherein:
  the digital threat inference includes a digital threat score that indicates a likelihood that the digital event is a fraudulent digital event;

retrieving, from a computer database, one or more T-Digest data structures of historical digital threat scores of the subscriber based on querying the database using an identifier of the subscriber as a search parameter;

computing, using the one or more T-Digest data structures of historical digital threat scores, a plurality of percentile-based threat scores based on the digital threat score computed for the digital event, wherein:
  each percentile-based threat score of the plurality of percentile-based threat scores indicates a threat severity percentile of the digital threat score relative to historical digital threat scores of the subscriber for a distinct time span; and executing an automated disposal decision computed for the digital event based on an assessment of (i) the digital threat score and (ii) at least one of the plurality of percentile-based threat scores against automated decisioning instructions of the digital threat mitigation platform.

13. The computer-implemented method according to claim 12, wherein:
the digital threat score includes a numerical value that quantifies the likelihood that the digital event is the fraudulent digital event; and
each of the plurality of percentile-based threat scores further indicates a relative percentile position or percentile rank of the digital threat score within a distribution of historical digital threat scores of the subscriber for a target time span.

14. The computer-implemented method according to claim 12, wherein:
the one or more T-Digest data structures of historical digital threat scores include:
a first T-Digest data structure that represents a distribution of digital threat scores of the subscriber that occurred within a first time span,
a second T-Digest data structure that represents a distribution of digital threat scores of the subscriber that occurred within a second time span,
a third T-Digest data structure that represents a distribution of digital threat scores of the subscriber that occurred within a third time span, and
a fourth T-Digest data structure that represents a distribution of digital threat scores of the subscriber that occurred within a fourth time span, wherein the first time span, the second time span, the third time span, and the fourth time span are different time spans.

15. The computer-implemented method according to claim 14, wherein:
computing the plurality of percentile-based threat scores include:
computing, using the first T-Digest data structure, a first percentile-based threat score that indicates the threat severity percentile of the digital threat score within the distribution of digital threat scores of the subscriber of the first time span;
computing, using the second T-Digest data structure, a second percentile-based threat score that indicates the threat severity percentile of the digital threat score within the distribution of digital threat scores of the subscriber of the second time span;
computing, using the third T-Digest data structure, a third percentile-based threat score that indicates the threat severity percentile of the digital threat score within the distribution of digital threat scores of the subscriber of the third time span; and
computing, using the fourth T-Digest data structure, a fourth percentile-based threat score that indicates the threat severity percentile of the digital threat score within the distribution of digital threat scores of the subscriber of the fourth time span.

16. A computer-implemented method for quantile-based assessment and handling of digital events in a digital threat mitigation platform, the method comprising:
computing, using one or more threat scoring machine learning models, a digital threat inference based on one or more corpora of feature vectors extracted from digital event data associated with a digital event of a subscriber, wherein:
the digital threat inference includes a digital threat score that indicates a likelihood that the digital event is a fraudulent digital event;
retrieving, from a database, a T-Digest data structure of historical digital threat scores of the subscriber based on querying the database using an identifier of the subscriber as a search parameter;
computing, using the T-Digest data structure of historical digital threat scores, a percentile-based threat score based on the digital threat score computed for the digital event, wherein:
the percentile-based threat score indicates a threat severity percentile of the digital threat score relative to historical digital threat scores of the subscriber for a target time span; and
executing an automated disposal decision computed for the digital event based on at least the percentile-based threat score satisfying automated decisioning instructions of the digital threat mitigation platform.

17. The computer-implemented method according to claim 16, wherein:
the automated decisioning instructions of the digital threat mitigation platform include an automated decisioning workflow, and
the automated decisioning workflow includes an automated decisioning route that automatically blocks or causes a review of a respective digital event when a given percentile-based threat score of a target time span computed for the respective digital event is greater than a predetermined percentile-based threat score threshold.

18. The computer-implemented method according to claim 16, wherein:
the automated decisioning instructions of the digital threat mitigation platform include an automated decisioning workflow, and
the automated decisioning workflow includes an automated decisioning route that automatically blocks or causes a review of a respective digital event when (i) a given percentile-based threat score of a target time span computed for the respective digital event is greater than a predetermined percentile-based threat score threshold and (ii) a given digital threat score computed for the respective digital event is greater than a predetermined digital threat score threshold.

19. The computer-implemented method according to claim 16, wherein:
the automated decisioning instructions of the digital threat mitigation platform include an automated decisioning workflow, and
the automated decisioning workflow includes an automated decisioning route that automatically blocks or causes a review of a respective digital event when (i) a given percentile-based threat score of a target time span computed for the respective digital event is greater than a predetermined percentile-based threat score threshold and (ii) a target feature associated with the respective digital event is greater than a predetermined feature threshold.

20. The computer-implemented method according to claim 16, wherein:
the digital threat score is an uncalibrated digital threat score,
the computer-implemented method further comprising:
(i) obtaining a subscriber-preferred t-digest data structure of digital threat scores, wherein the subscriber-preferred t-digest data structure of digital threat scores represents a score distribution preference of the subscriber;
(ii) identifying, within a subscriber-preferred t-digest data structure of digital threat scores, a calibrated digital threat score value based on querying the subscriber-preferred t-digest data structure of digital threat scores using the threat severity percentile as a query parameter, wherein calibrated digital threat score value corresponds to a same percentile of the threat severity percentile computed for the digital threat score; and (iii) executing the automated disposal decision computed for the digital event based on the percentile-based threat score and the calibrated digital threat score value satisfying the automated decisioning instructions of the digital threat mitigation platform.

* * * * *